United States Patent
Bowman et al.

(10) Patent No.: US 6,233,726 B1
(45) Date of Patent: *May 15, 2001

(54) DEVELOPMENT SYSTEM WITH REFERENCE CARD AND PARAMETER WIZARD METHODOLOGIES FOR FACILITATING CREATION OF SOFTWARE PROGRAMS

(75) Inventors: Ivan Thomas Bowman, Kitchener; Geno Coschi; Robert Veitch, both of Waterloo, all of (CA)

(73) Assignee: Sybase, Inc., Emeryville, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/852,818

(22) Filed: May 7, 1997

Related U.S. Application Data

(60) Provisional application No. 60/045,197, filed on Apr. 30, 1997, and provisional application No. 60/038,824, filed on Feb. 5, 1997.

(51) Int. Cl.$^7$ ........................................... G06F 9/45
(52) U.S. Cl. ...................... 717/2; 717/1; 717/2; 717/3; 707/102; 707/103
(58) Field of Search ..................... 395/701, 702, 395/703, 710; 345/435, 113, 334, 347, 349, 326; 707/103, 104, 501

(56) References Cited

U.S. PATENT DOCUMENTS

| | | | |
|---|---|---|---|
| 5,437,014 | * 7/1995 | Busboom et al. | 345/329 |
| 5,485,618 | 1/1996 | Smith | 395/700 |
| 5,487,141 | * 1/1996 | Cain et al. | 345/435 |
| 5,495,567 | * 2/1996 | Lizawa et al. | 345/334 |
| 5,544,302 | * 8/1996 | Nguyen | 345/326 |
| 5,603,021 | 2/1997 | Spencer et al. | 345/604 |
| 5,617,114 | * 4/1997 | Bier et al. | 345/113 |
| 5,634,057 | * 5/1997 | Dickinson | 709/315 |
| 5,634,095 | * 5/1997 | Wang et al. | 345/326 |
| 5,642,511 | * 6/1997 | Chow et al. | 395/701 |
| 5,664,180 | * 9/1997 | Halpert et al. | 707/102 |

(List continued on next page.)

OTHER PUBLICATIONS

Howard Millman, Powersoft serves middle ground with optima ++, Computerworld, v 30, n 16, pp62, Apr. 15, 1996.*

(List continued on next page.)

Primary Examiner—James P. Trammell
Assistant Examiner—Anil Khatri
(74) Attorney, Agent, or Firm—John A. Smart

(57) ABSTRACT

A visual development environment is described which provides drag-and-drop code editing methodology, using Reference Card and Parameter Wizard methodologies. A Reference Card provides quick information on the most important classes and member functions, within one's code. During a session, the user may use the Reference Card to select an action that the user wants to perform. The user can search through a hierarchy of actions or perform a text search to locate the desired action, then open the Parameter Wizard to create the code (e.g., C++ code) required to perform that action. The Reference Card also provides help on all the items listed. The Parameter Wizard, which operates in conjunction with the Reference Card, guides the user through the construction of function calls. This is particularly useful for complicated functions or for functions with which the user is unfamiliar. The Parameter Wizard helps the user construct a function call by showing what argument values are required. The Parameter Wizard can also store function results in a specified variable. Using this drag-and-drop methodology, users can create program code with minimal user input or understanding.

35 Claims, 40 Drawing Sheets

Microfiche Appendix Included
(2 Microfiche, 96 Pages)

U.S. PATENT DOCUMENTS

| | | | |
|---|---|---|---|
| 5,668,966 | * | 9/1997 | Ono et al. .............................. 345/355 |
| 5,742,286 | * | 4/1998 | Kung et al. ........................... 345/349 |
| 5,760,773 | * | 6/1998 | Berman et al. ....................... 345/347 |
| 5,760,788 | * | 6/1998 | Chainini et al. ...................... 345/474 |
| 5,913,063 | * | 5/2000 | McGurrin et al. ....................... 717/2 |
| 6,002,867 | * | 12/1999 | Jazdzewski .............................. 717/1 |
| 6,069,627 | * | 5/2000 | Conrad et al. ....................... 345/347 |

OTHER PUBLICATIONS

Dan Rogers, Symantec's World Visual Cafe' 1.0, Software Development, Mar. 1997, vol. 5, No. 3, pp 15–20.*

Fridel et al. Cafe' Programming Front Runner, The Coriolis Group, pp 142 & 156, 1996.*

Rick Grehan, beyond the bouncing heads, Byte, v 21, 10/96. p. 216, 1996.*

James Powell, Hotdog could use a little more mustard—Hotdog Professional 3.0, Windows Magazine, May 1, 1997, v 8, n 5, p 160.*

Rick Grehan, A C ++ tool that cures VB entry—Powersoft's Optima ++ makes C ++ client/server development a drap and drop dream, Byte Oct. 1, 1996, v21, n10, p 153.*

Gess Shankar, Build aplets by drag and drop with parts for Java, Infoworld, Sep., 16, 1996, v18, n38, plW/6.*

Rothermel et al, "WHat you see is what you test: a methodology for testing form based visual programs", IEEE, pp 198–207, Jun. 1998.*

Myers, "Visual programming, programming by example and program visualization a taxonomy", ACM pp 59–66.*

Canning et al, "Visual programming in Xwindows workstation environment", ACM pp 4–10, May 1991.*

Tidwell et al, "Taskguides Instant wizard on the web", ACM SIGDOC, pp 263–272, Apr. 1997.*

Manhartsberger et al, "Wizard non WIMP oriented prototyping of direct manipulative behavior", ACM CHI pp 111–112, Apr. 1994.*

* cited by examiner-

```
Form1: All Code
File  Edit  View  Search  Options  Debug  Run  Window  Help

Bookmark: cb_1_Click

Form1::Form1()
{

}

Form1::~Form1()
{

}

WBool Form1::cb_1_Click(
    WObject *        source,
    WEventData *     event )
{
    WString                              text;          ~751 text = textb_1->GetText();   ~753 return FALSE;

Ln 44 Col 5                              Modified
```

FIG. 7I

```
Form1: All Code

File  Edit  View  Search  Options  Debug  Run  Window  Help

Bookmark: cb_1_Click

{

}

Form1::~Form1()
  {                                                  837

}

WBool Form1::cb_1_Click(
      WObject *          source,
      WEventData *       event )
  {
      WInt                              result;
      WString                           text;

text = textb_1->GetText();
      result = lb_1->Add( text, -1, NULL );

return FALSE;

Ln 46 Col 5                        Modified
```

FIG. 8I

DEVELOPMENT SYSTEM WITH REFERENCE CARD AND PARAMETER WIZARD METHODOLOGIES FOR FACILITATING CREATION OF SOFTWARE PROGRAMS

This application claims priority from commonly-owned provisional application Serial No. 60/038,824, entitled DEVELOPMENT SYSTEM WITH REFERENCE CARD AND PARAMETER WIZARD METHODOLOGIES FOR FACILITATING CREATION OF SOFTWARE PROGRAMS, filed Feb. 5, 1997, now pending, and further claims priority from commonly-owned provisional application Serial No. 60/045,197, entitled DEVELOPMENT SYSTEM WITH REFERENCE CARD AND PARAMETER WIZARD METHODOLOGIES FOR FACILITATING CREATION OF SOFTWARE PROGRAMS, filed Apr. 30, 1997, now pending, the disclosures of which are hereby incorporated by reference.

MICROFICHE APPENDIX

A two-fiche Microfiche Appendix, containing 96 frames, is included with this application.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to a system providing methods for facilitating development of software programs, with particular emphasis on decreasing the time a programmer spends creating or modifying source code during program development.

Before a digital computer may accomplish a desired task, it must receive an appropriate set of instructions. Executed by the computer's microprocessor, these instructions, collectively referred to as a "computer program," direct the operation of the computer. Expectedly, the computer must understand the instructions which it receives before it may undertake the specified activity.

Owing to their digital nature, computers essentially only understand "machine code," that is, the low-level, minute instructions for performing specific tasks—the sequence of ones and zeros that are interpreted as specific instructions by the computer's microprocessor. Since machine language or machine code is the only language computers actually understand, all other programming languages represent ways of structuring "human" language so that humans can get computers to perform specific tasks.

While it is possible for humans to compose meaningful programs in machine code, practically all software development today employs one or more of the available programming languages. The most widely-used programming languages are the "high-level" languages, such as C or Pascal, or more recently Java. These languages allow data structures and algorithms to be expressed in a style of writing which is easily read and understood by fellow programmers.

A program called a "compiler" translates these instructions into the requisite machine language. In the context of this translation, the program written in the high-level language is called the "source code" or source program. The ultimate output of the compiler is a compiled module such as a compiled C "object module," which includes instructions for execution ultimately by a target processor, or a compiled Java class, which includes opcode instructions for execution ultimately by a Java virtual machine. Although a compiled module includes code for instructing the operation of a computer, such a module itself is typically not in a form which may be directly executed by a computer. In other words, it does not form the final program which is executable on a computer. Instead, it must undergo a "linking" operation before the final executable program is created.

Linking may be thought of as the general process of combining or linking together one or more compiled object modules to create an executable program. This task usually falls to a program called a "linker." In typical operation, a linker receives, either from the user or from an integrated compiler, a list of object modules desired to be included in the link operation. The linker scans the object modules from the object and library files specified. After resolving interconnecting references as needed, the linker constructs an executable image by organizing the object code from the modules of the program in a format understood by the operating system program loader. The end result of linking is executable code (such as an .exe file) which, after testing and quality assurance, is passed to the user with appropriate installation and usage instructions.

Increasingly, the traditional programming tools (i.e., integrated editor/compiler/debugger developer tools) have evolved into visual rapid application development or "RAD" tools which deliver component-based programming. Instead of writing code from scratch, a programmer creates a program by assembling existing components or controls. Basically, the programmer "drags" existing (standard) components or objects onto a form and then attaches program code to those objects. By decreasing the need to write code, these tools have improved programmer productivity.

Even with all the assistance that a modern visual RAD environment affords, software development still remains a slow process. Development of a program of even modest complexity requires a substantial amount of "coding"—that is, crafting source code by hand. Although much progress has been made in eliminating the need to write code for program elements which can be represented as objects, particularly user interface objects, little has been done to date to help programmers with the task of creating program logic which must be coded. Although components can be visually placed on a form, there still exists a need to write custom code to handle events which arise from those components. To add handler code for a component visually added to a form, for instance, a programmer must have some understanding of the methods, properties, and events for that component. If the programmer selects a particular method of the component, he or she might have to provide required values, including parameter and return values.

What is needed is a system with methods for assisting a programmer with the task of actually creating source code, including custom program code which must be added by the programmer. Such a system should enable the programmer to easily add code to components which the programmer knows little about, all without requiring the programmer to refer to header files or other source files for those components. The present invention fulfills this and other needs.

SUMMARY OF THE INVENTION

A visual development environment is described which provides tools that facilitate creation and editing of source code. These tools include Editors, a Reference Card (feature), and a Parameter Wizard. Of particular interest, a code editor, which is a full-featured editor that can be used to edit the source code (e.g., C++ code) for a project, supports drag-and-drop code editing methodology of the present invention, using Reference Card and Parameter Wizard methodologies.

A Reference Card provides quick information on the most important classes and member functions, within one's code. During a session, the user may use the Reference Card to select an action that the user wants to perform. The user can search through a hierarchy of actions or perform a text search to locate the desired action, then open the Parameter Wizard to create the code (e.g., C++ code) required to perform that action. The Reference Card also provides help on all the items listed.

The Parameter Wizard, which operates in conjunction with the Reference Card, guides the user through the construction of function calls. This is particularly useful for complicated functions or for functions with which the user is unfamiliar. The Parameter Wizard helps the user construct a function call by showing what argument values are required. The Parameter Wizard can also store function results in a specified variable.

During use, the Parameter Wizard displays text boxes in a wizard window which lets the user enter variable names, constants, or expressions. The user can use the right mouse button to click the text box and get a list of variables that may be entered. Click on a name from this list to place that name into the text box. The user can also type in entries directly. When the user clicks Finish, the wizard pastes the constructed function call into the code editor window. The wizard also inserts declarations for any local variables that the method requires. Using drag-and-drop methodology of the present invention, the user can create the program code with minimal user input.

BRIEF DESCRIPTION OF THE DRAWINGS

FIGS. 7A–I are bitmap screenshots illustrating drag-and-drop user interface operation in the system of the present invention, for adding code to the Sample Program with minimal typing.

FIGS. 8A–K are bitmap screenshots illustrating use of Reference Card and Parameter Wizard dialogs during user operation of the drag-and-drop user interface operation in the system of the present invention.

DETAILED DESCRIPTION OF A PREFERRED EMBODIMENT

The following description will focus on a preferred embodiment of the present invention (and certain alternatives) embodied in a visual development environment running on an Intel 80×86-compatible computer operating under an event-driven operating system, such as the Microsoft® Windows environment. The present invention, however, is not limited to any particular application or any particular environment. Instead, those skilled in the art will find that the system and methods of the present invention may be advantageously applied to a variety of platforms and environments, whether command-line or GUI based, including MS-DOS, Macintosh, UNIX, NextStep, and the like. Therefore, the description of the exemplary embodiments which follows is for purposes of illustration and not limitation.

General Architecture

A. System Hardware

Figure 1:
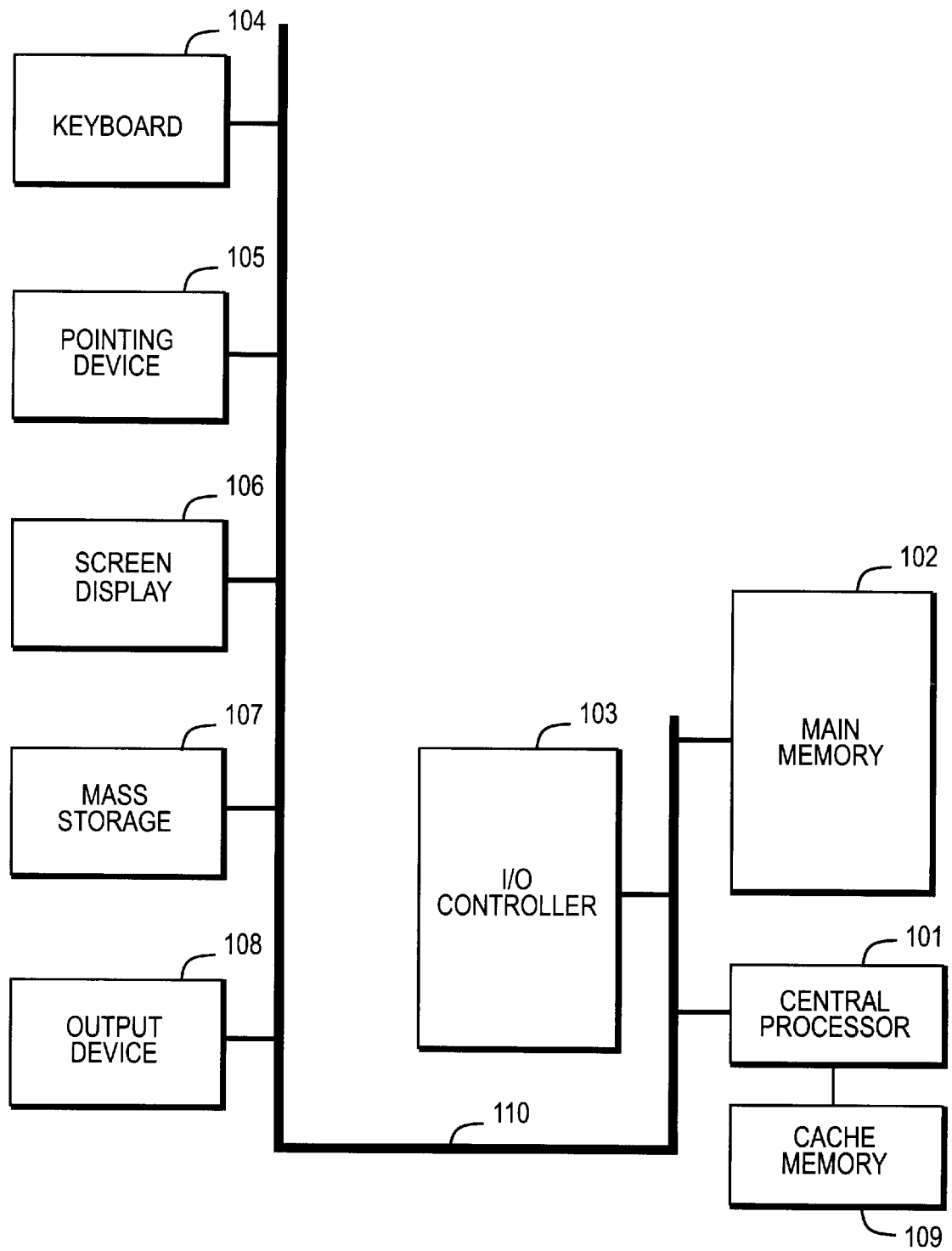
FIG. 1 is a block diagram of a computer system in which the present invention may be embodied.

The present invention may be embodied on a computer system such as the system 100 of FIG. 1, which includes a central processor 101, a main memory 102, an input/output controller 103, a keyboard 104, a pointing device 105 (e.g., mouse, track ball, pen device, or the like), a display device 106, a mass storage 107 (e.g., removable disk, floppy disk, fixed disk, optical disk (including CD-ROM), and the like), and a cache memory 109. Additional input/output devices, such as a printing device 108, may be provided with the system 100 as desired. As shown, the various components of the system 100 communicate through a system bus 110 or similar architecture. In a preferred embodiment, the system 100 includes an IBM-compatible personal computer, available from a variety of vendors (including IBM of Armonk, N.Y.).

B. System Software

Figure 2:
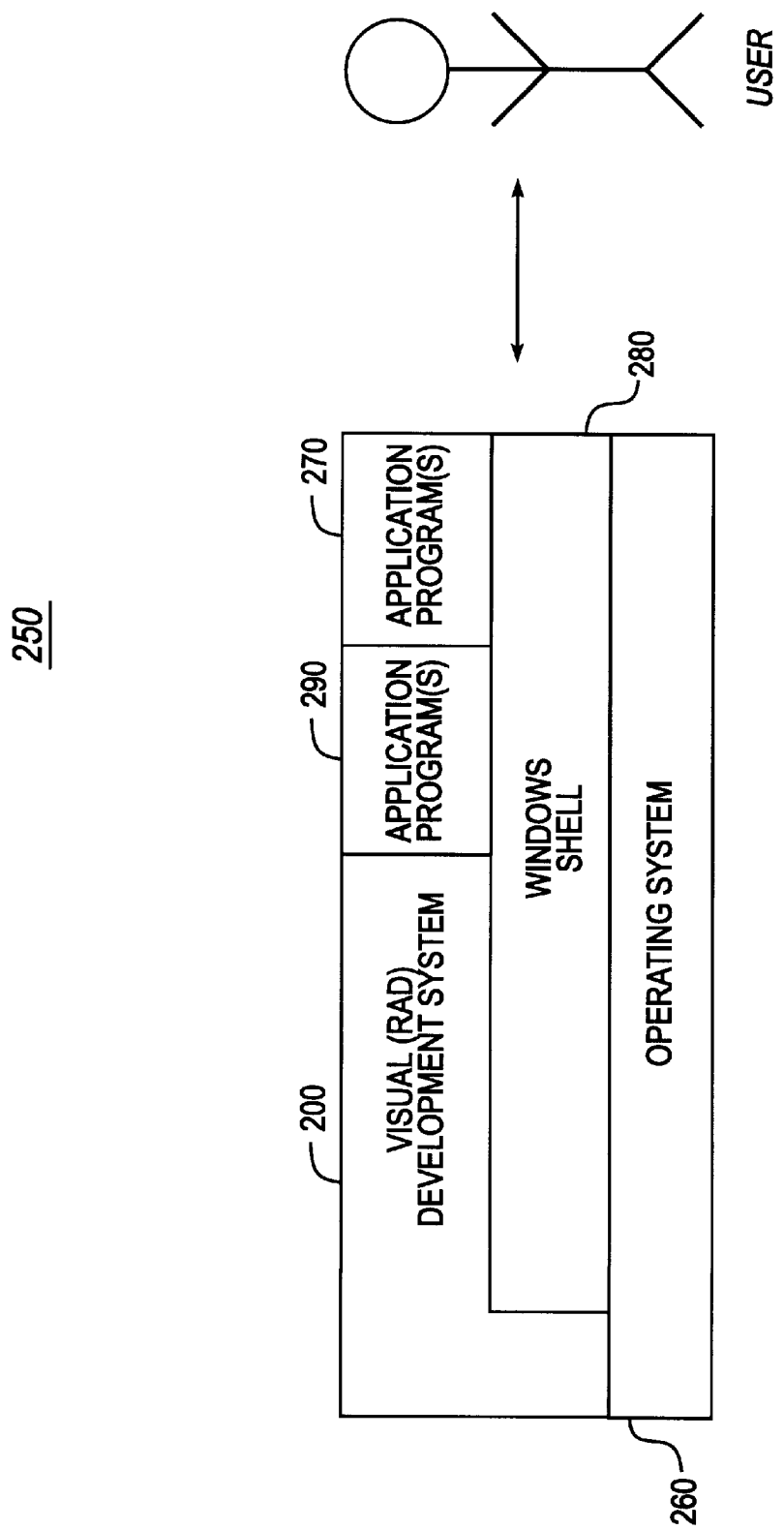
FIG. 2 is a block diagram of a computer software system provided for directing the operation of the computer system of FIG. 1.

Illustrated in FIG. 2, a computer software system 250 is provided for directing the operation of the computer system 100. Software system 250, which is stored in system memory 102 and/or on disk storage 107, includes a kernel or operating system (OS) 260 and a windows shell or interface 280. One or more application programs, such as application programs 270 or windows applications programs 290, may be "loaded" (i.e., transferred from storage 107 into memory 102) for execution by the system 100. OS 260 and shell 280, as well as application software 270, 290, include an interface for receiving user commands and data and displaying results and other useful information. Software system 250 also includes a visual development system 200 of the present invention for developing system and application programs. As shown, the development system 200 includes components which interface with the system 100 through windows shell 280, as well as components which interface directly through OS 260.

In a preferred embodiment, operating system 260 and windows shell 280 are provided by Microsoft® Windows 95/Windows NT, available from Microsoft Corporation of Redmond, Wash. Those skilled in the art will appreciate that the system may be implemented in other platforms, including Macintosh, UNIX, and the like. Development system 200, on the other hand, includes a component-based visual development environment, of the present invention. Application software 270, 290 can be any one of a variety of software applications, such as word processing, database, spreadsheet, text editors, and the like, including those created by the development system 200.

The following description will focus on those aspects of the development system, as embodied in the commercial embodiment of Optima++™ Enterprise, which are helpful for understanding the reference card and parameter wizard methodologies of the present invention. Additional description of the system is set forth in the documentation provided with Optima++ Enterprise (version 1.5), including Getting Started manual Part No. AA0402, Programmer's Guide Part No. AA0401, Data Window Builder User's Guide Part No. AA0393), and media, Part No. MA0003, all available from Sybase, Inc. of Emeryville, Calif., the disclosures of which are hereby incorporated by reference.

Visual Application Development System

A. Integrated Development Environment

Before describing reference card and parameter wizard methodologies of the present invention in detail, it is first helpful to review the integrated development environment or "IDE" provided in the system of the present invention (e.g., as embodied in the commercial embodiment of Powersoft Optima++™).

1. Worksurface Interface

Figure 3A:
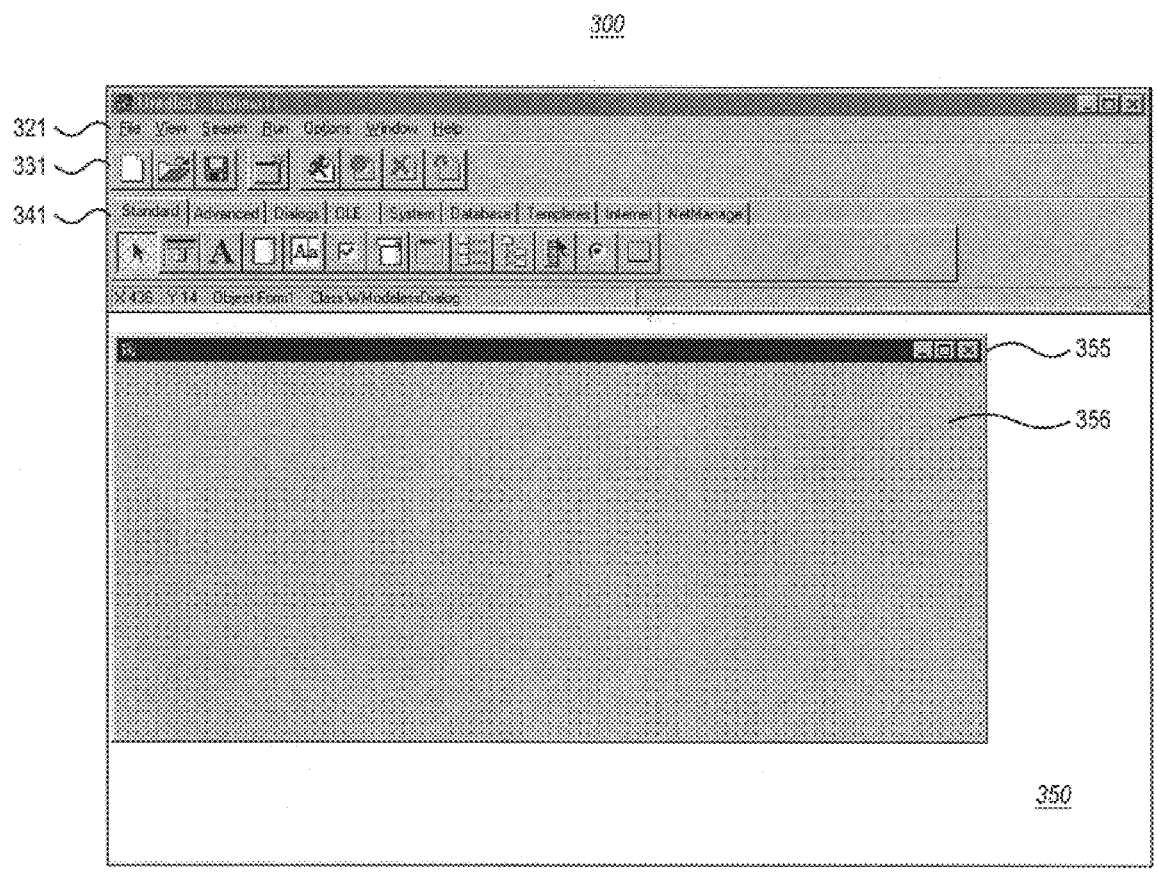
FIG. 3A is a bitmap screenshot illustrating a preferred worksurface interface provided by the system of the present invention.

FIG. 3A illustrates a preferred worksurface interface 300 provided by the IDE. As shown, the worksurface interface 300 includes a menu bar 321, a top or main toolbar 331, a component palette 341, and a status bar 333. The worksurface interface 300 provides a working space 350, within the confines of its main window, which displays a form design window 355. Each will be explained in turn.

The menu bar 321 offers menus (in a conventional manner) whose commands help the user create and test the user's application. When the user points to a menu item, the status bar 333 at the bottom of the main window offers a brief explanation of each menu item. The status bar 333 also displays information about other actions that the system performs; for example, it tells the user when the system initializes files for a new project. The toolbar 331, which appears below the main menu bar 321, offers quick mouse access to many of the IDE's commands and features. The user can preview the functionality of any toolbar button by pointing to the button and waiting a moment, whereupon the system displays a "tool tip," in a conventional manner. The component palette 341 comprises a set of screen buttons which correspond to the objects the user can place on a form. To add an object to a form, such as form 356, the user clicks a component button and then clicks on the form. This places an object of the selected type on the form. As with the toolbar buttons, tool tips are provided for previewing the functionality of the component palette buttons.

A form, such as form 356, is a window which contains objects like command buttons and text boxes. The user uses forms to create the user's program's main window, secondary windows, dialog boxes, and so forth. The form design window 355 lets the user arrange objects on the form and adjust the form's size, as the user designs the appearance of the user's program. The grid of dots on the form design window helps the user to judge the size and position of objects on the form; the dots do not appear when the user runs the user's program.

Figure 3B:
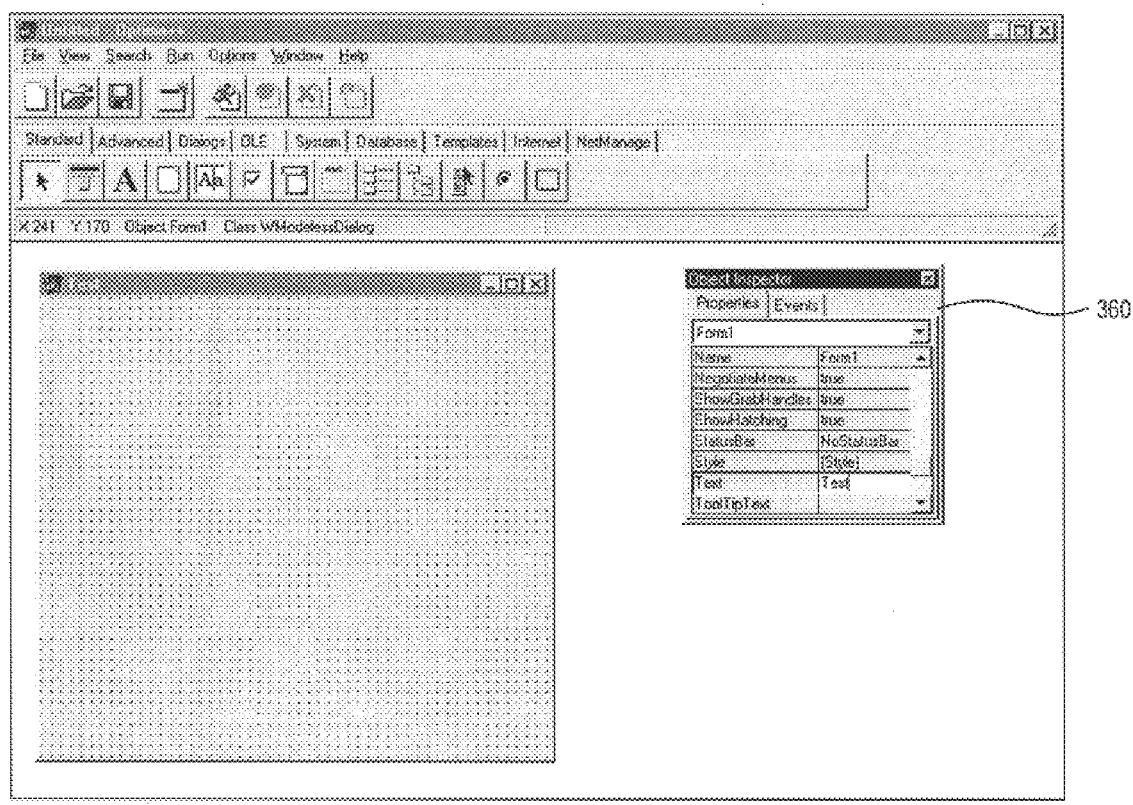
FIGS. 3B–F are bitmap screenshots illustrating user operation of the worksurface interface of FIG. 3A.

As shown in FIG. 3B, the user can instruct the system (View|Object Inspector) to optionally display an Object Inspector dialog 360 which lets the user view and change properties and events of a selected object When the user is viewing the Properties page of the Object Inspector, as shown, the dialog displays all properties for the selected object (e.g., for "Form1"). The user can change the value of a property by selecting it (e.g., clicking on it) and then changing the value in the right pane.

Figure 3C:
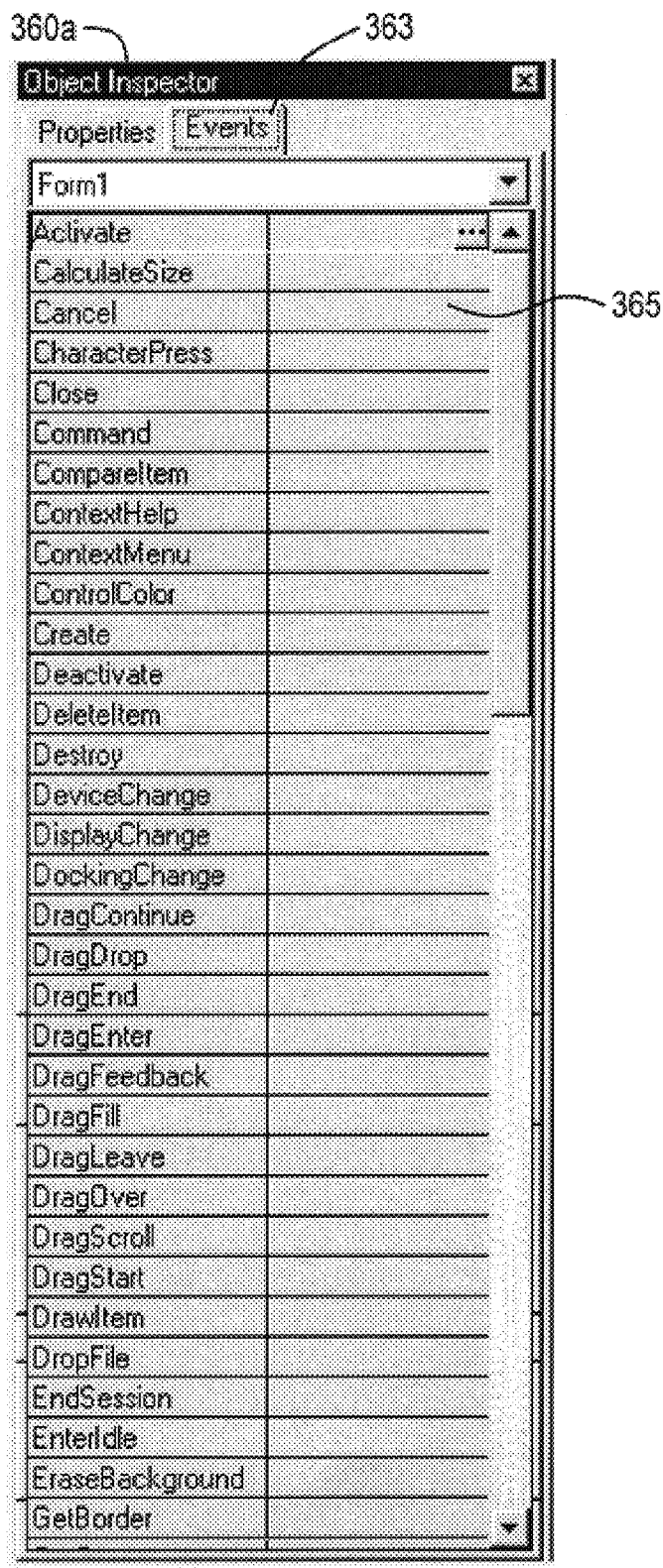

In a corresponding manner, the Events page 363 of the Object Inspector 360 (now 360*a*), as shown (resized) in FIG. 3C, lists all events applicable to the selected object. The user can double-click on an event, such as "Cancel" event 365, to open a code editor for the code that will be invoked when that event occurs. If there is no event handling code for an event, the right pane for that event is blank. If an event handler is already defined for a particular event, the right pane for that event displays the function or method which serves as the event handler.

2. View Windows

Figure 3D:
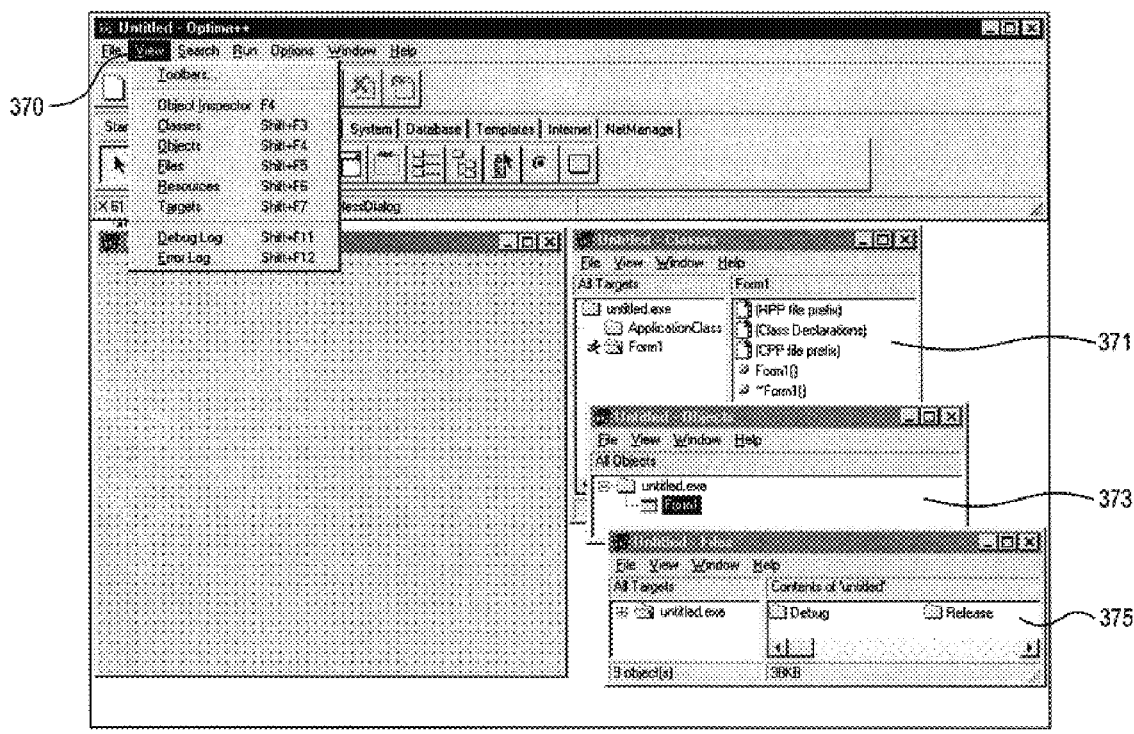

The IDE offers a number of "view" windows to display information about the user's current project. As shown in FIG. 3D, the user can display a particular view window by selecting the window's name from the "View" submenu 370 of the main menu 321. In response, the system displays the corresponding view windows, such as Classes window 371, Objects window 373, and Files window 375, as shown.

The Classes window 371 lists the contents of each class that defines a form and each class that the user has specifically asked to control through the Classes window. The window displays all the member functions, as well as any data objects the user has defined for the form and any #include statements required by the form's source code. If the user double-clicks any name in the list, the system displays a code editor window where the user can edit the selected function or data declarations. The Classes window also lets the user add new member functions to a class, and change or delete existing functions. If the user uses the Classes window to create new C++ classes for the user's target, the user can examine and edit them in the same ways as for the generated form classes. Classes that the user creates and maintains in this way are called "managed" classes. The user may prefer to create and maintain classes this way instead of using the traditional C++ way with declarations in header (e.g., HPP) files and definitions in source (e.g., CPP) files.

Figure 3E:
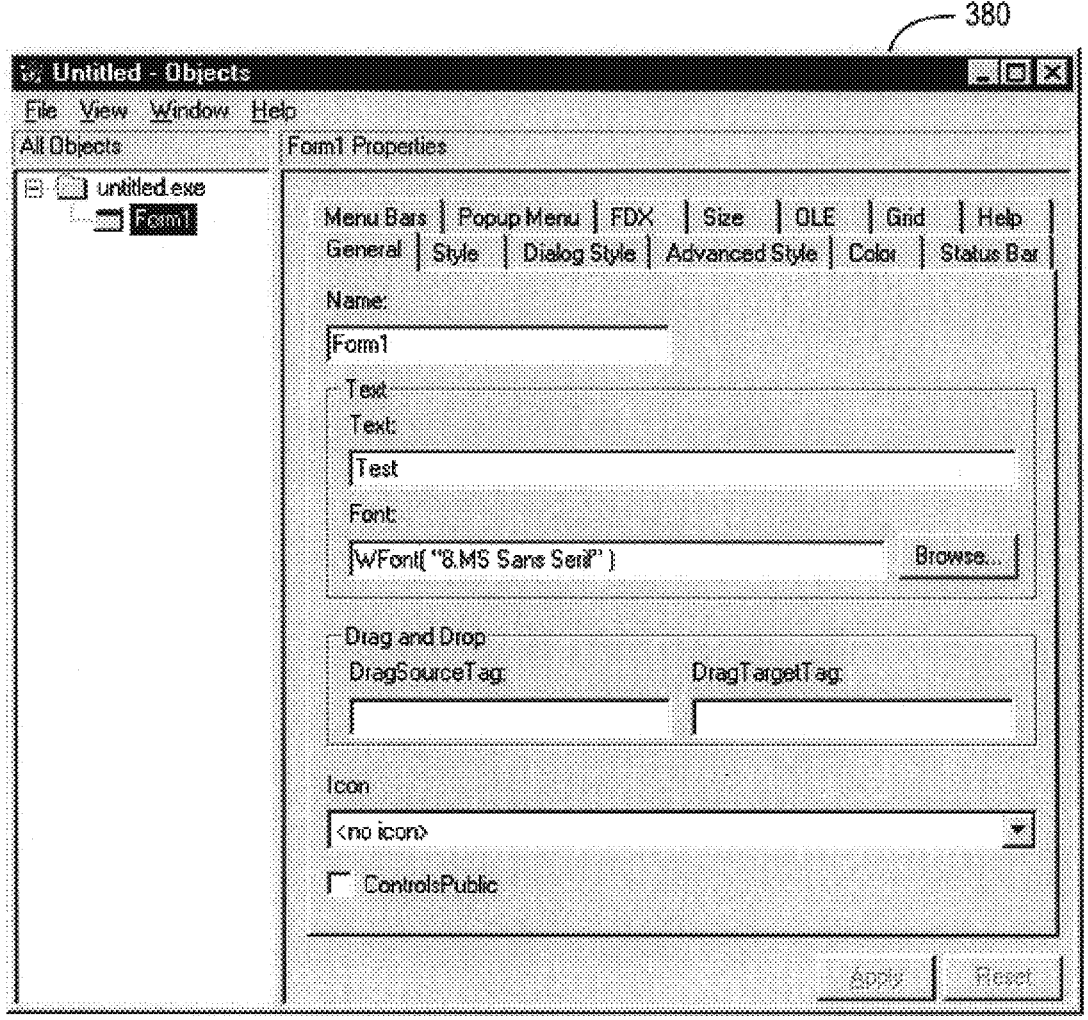

The Objects window 373 lists the objects on each form of the user's project, using a hierarchical display format. Targets are shown at the top of the hierarchy. The user can expand the tree at a form icon to show all the objects that belong to the form. Double-clicking an object displays its property sheet. The user can then use the sheet to view or change any of the object's properties. Clicking an object with the right mouse button opens a context menu for manipulating the object (e.g., deleting an object from a form). The Objects window has a second format, shown by Objects dialog 380 in FIG. 3E, obtained by turning on Show Property Sheet in the Objects window View menu. The dialog 380 displays property sheets for selected objects, thus allowing a user to easily examine or change an object's properties.

The Files window 375 lists the files associated with the user's project, in a format that is similar to that employed by Windows Explorer. Using the "File" menu of the Files window 375, the user can easily add items to or delete items from the user's project, for example, the user can import files of source code that were written for other projects. When the user is working with a project that has many source files, the Files window facilitates project management.

Figure 3F:
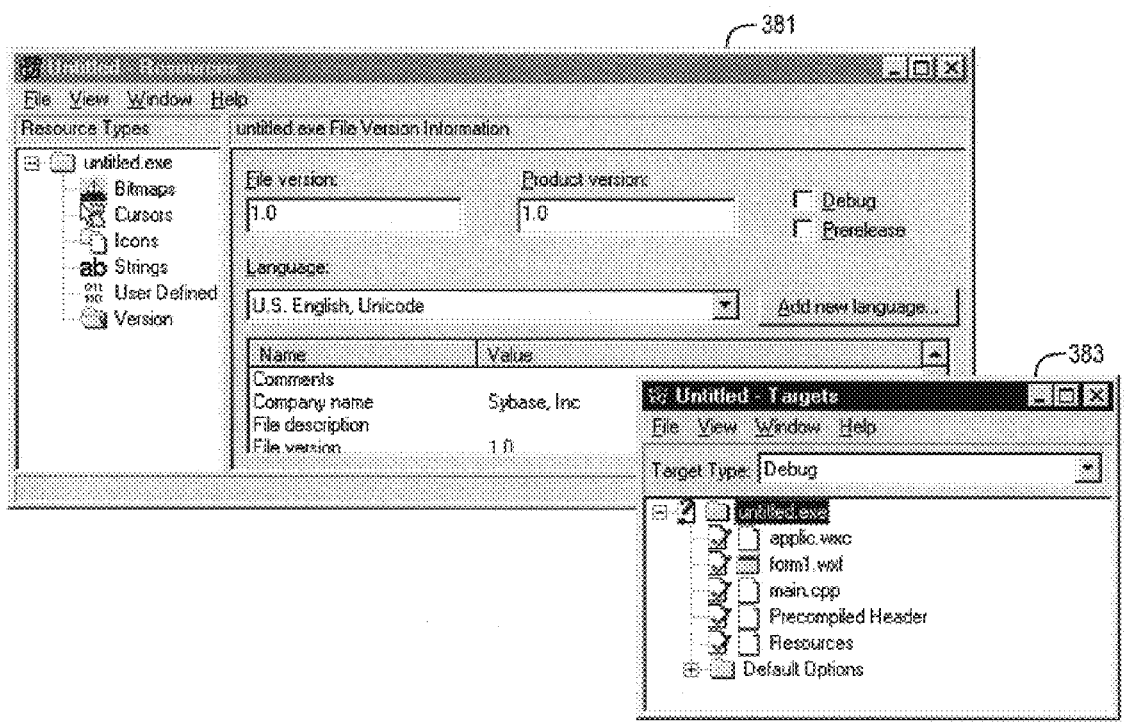

Other view windows provided by the system include a Resource window 381 and a Targets window 383, as illustrated in FIG. 3F. The user uses the Resources window 381 to create and edit the resources used by the user's program. Resources include bitmaps, icons, cursor images, string data, version information, and other types of specialized data that the user's program may use during execution. The Targets window 383, on the other hand, displays the target files and the files that the system will use to create them. A target is an executable program, library, or DLL that the user creates in the system.

3. Coding Tools

The IDE in the system of the present invention provides tools that facilitate creation and editing of source code. These tools include Editors, a Reference Card (feature), and a Parameter Wizard. Each will be described in further detail.

(a) Editors

Figure 4A:
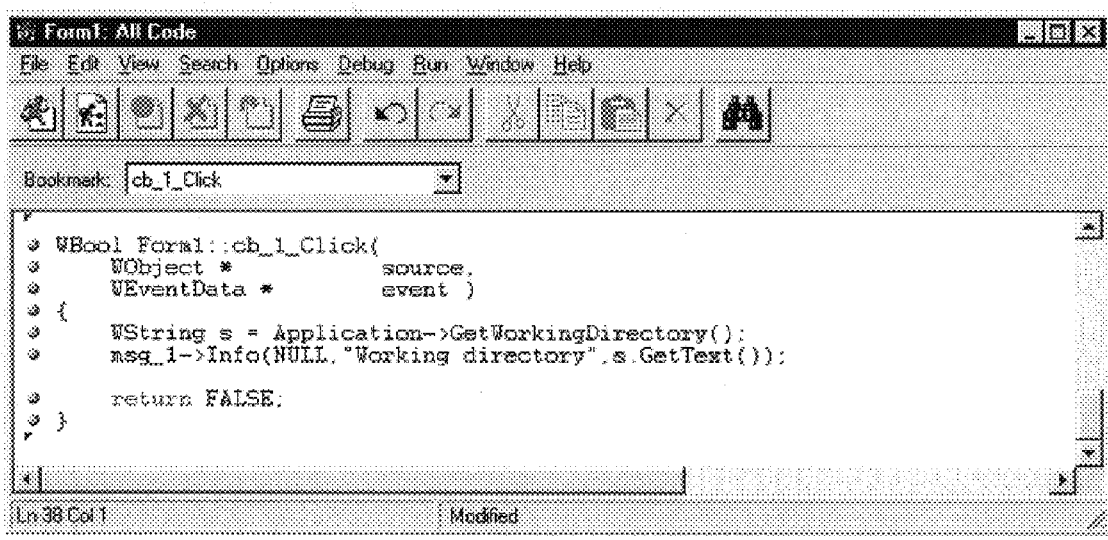
FIGS. 4A–C are bitmap screenshots illustrating user operation of a code editor, a menu editor, and a tabs editor, which are provided by the worksurface interface.

Editors provided by the system include a code editor, a menu editor, and a tabs editor. Code Editor 400, illustrated in FIG. 4A, is a full-featured editor that can be used to edit the C++ code for a project. The Code Editor provides an edit window with automatic indenting and syntax coloring to make C++ code easier to write and understand. The interface provides other conventional editing features, including unlimited undo, find and replace using pattern-matching, and debugging control. Additionally, the Code Editor window 400 supports drag-and-drop code editing methodology of the present invention, as described in further detail hereinbelow.

Figure 4B:
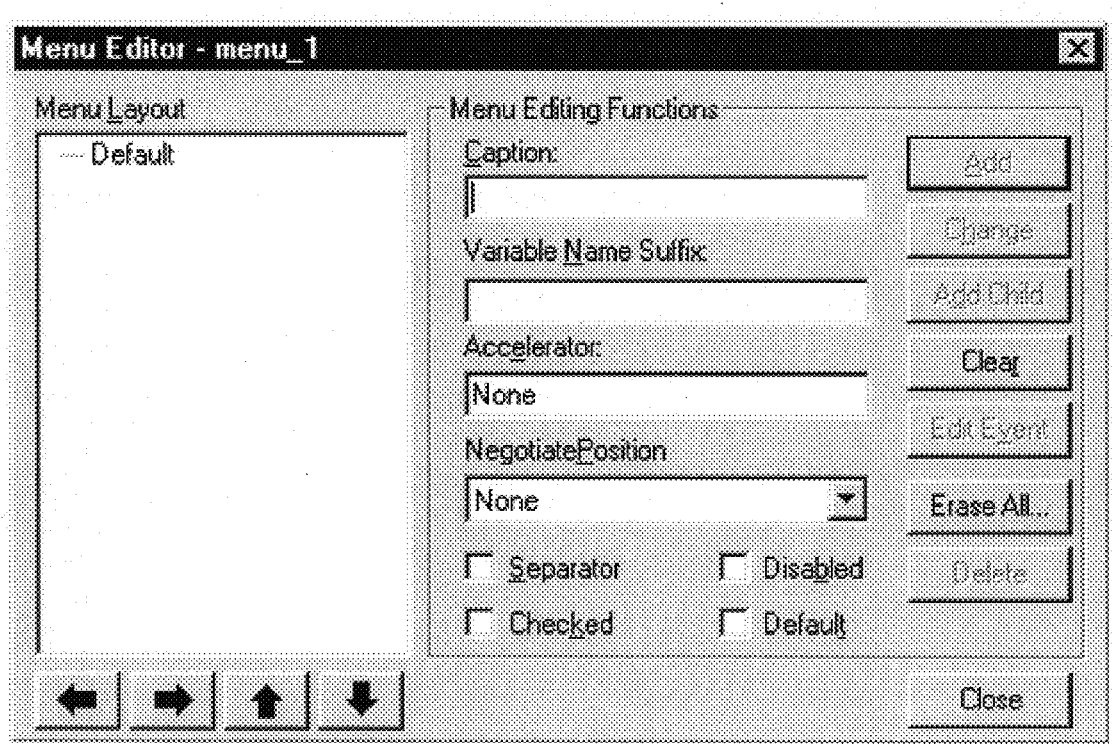
Figure 4C:
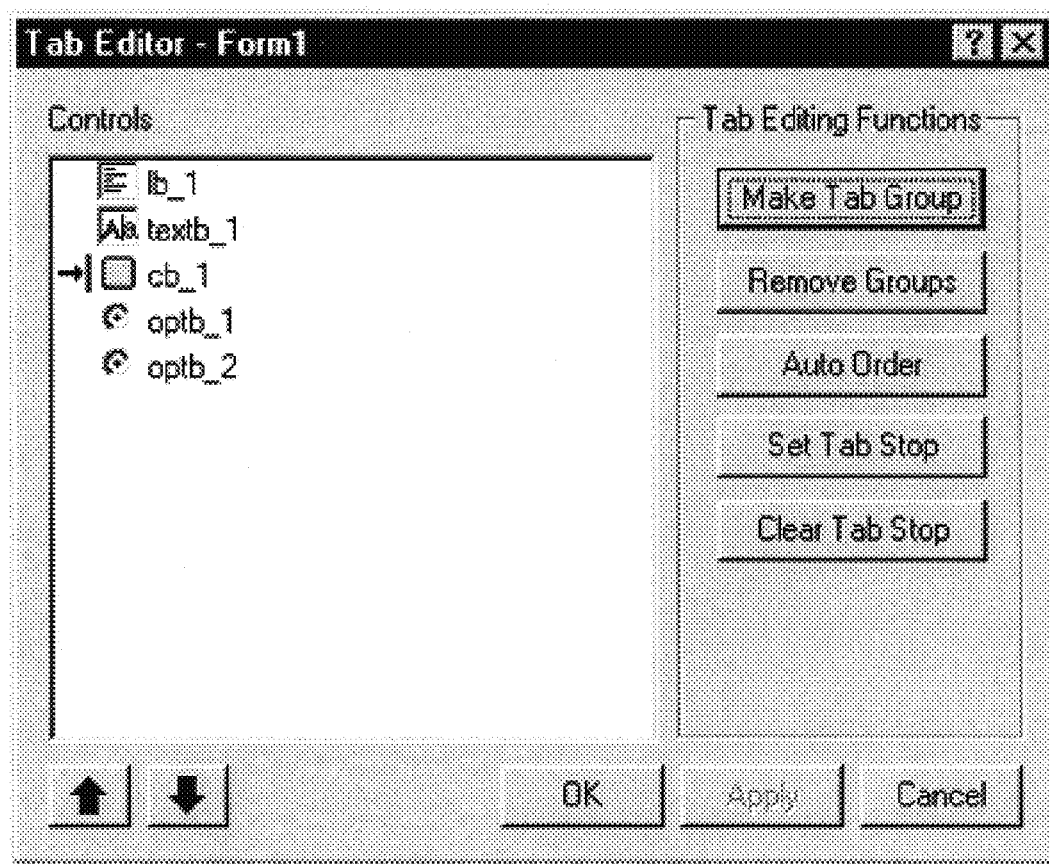

Menu editor 420, illustrated in FIG. 4B, allows the user to create the menu bar, pop-up menus and context menus of the user's application. To open the menu editor for a form, the user places a Menu object on the form. The user can then right mouse button click on the object and select Edit Menu for entering appropriate menu entries. Tab editor 430, illustrated in FIG. 4C, is employed to specify the tabbing order for objects on a form. The tabbing order controls the effects of pressing the TAB key while a form is active at runtime.

(b) Reference Card

Figure 5A:
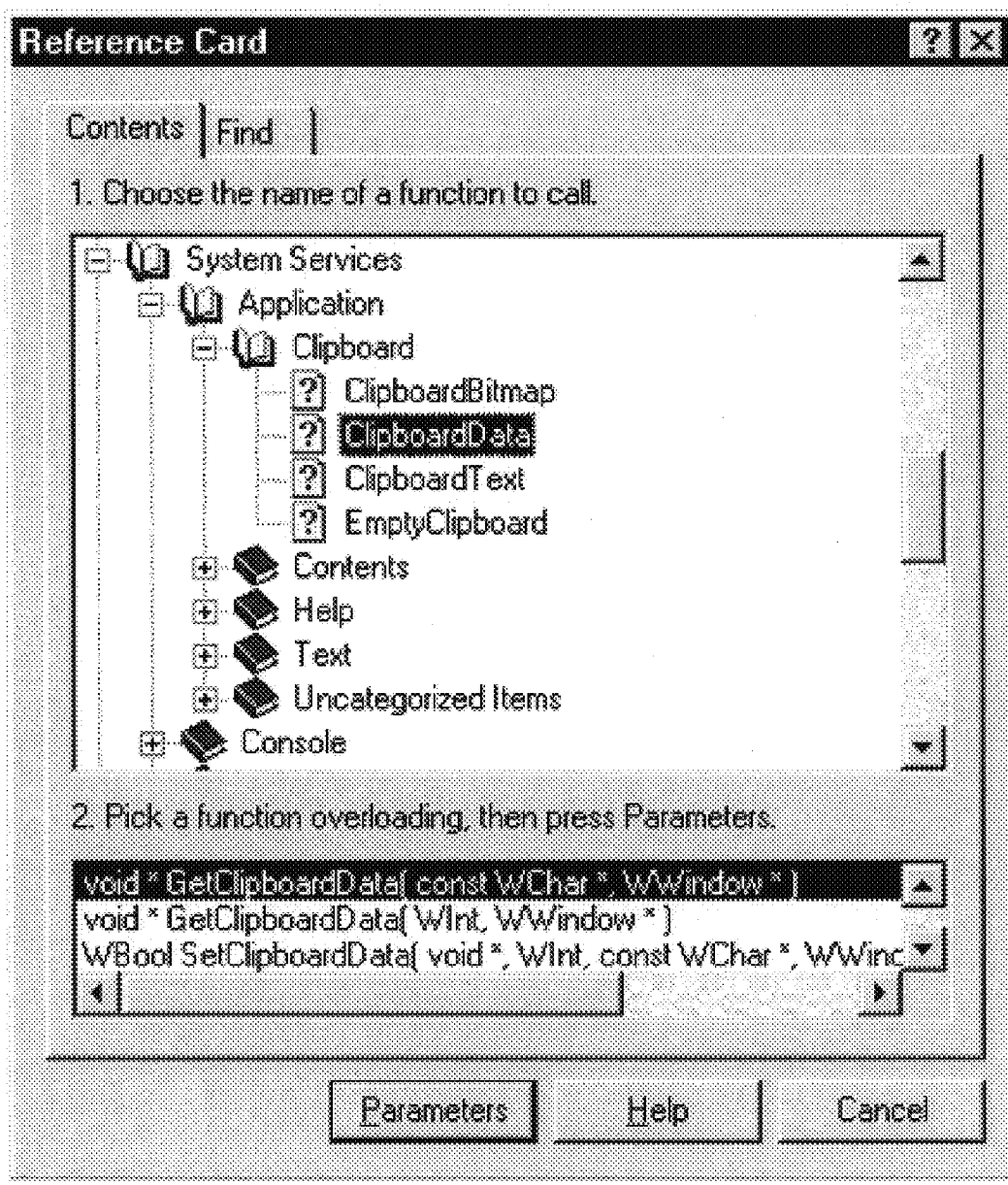
FIGS. 5A–B are bitmap screenshots illustrating Reference Card and Parameter Wizard dialogs provided by the system of the present invention.

The Reference Card, illustrated as Reference Card dialog 500 in FIG. 5A, provides quick information on the most important classes and member functions. During a session, the user may use the Reference Card to select an action that the user wants to perform. The user can search through a hierarchy of actions or perform a text search to locate the desired action, then open the Parameter Wizard to create the C++ code required to perform that action. The Reference Card also provides help on all the items listed.

(c) Parameter Wizard

Figure 5B:
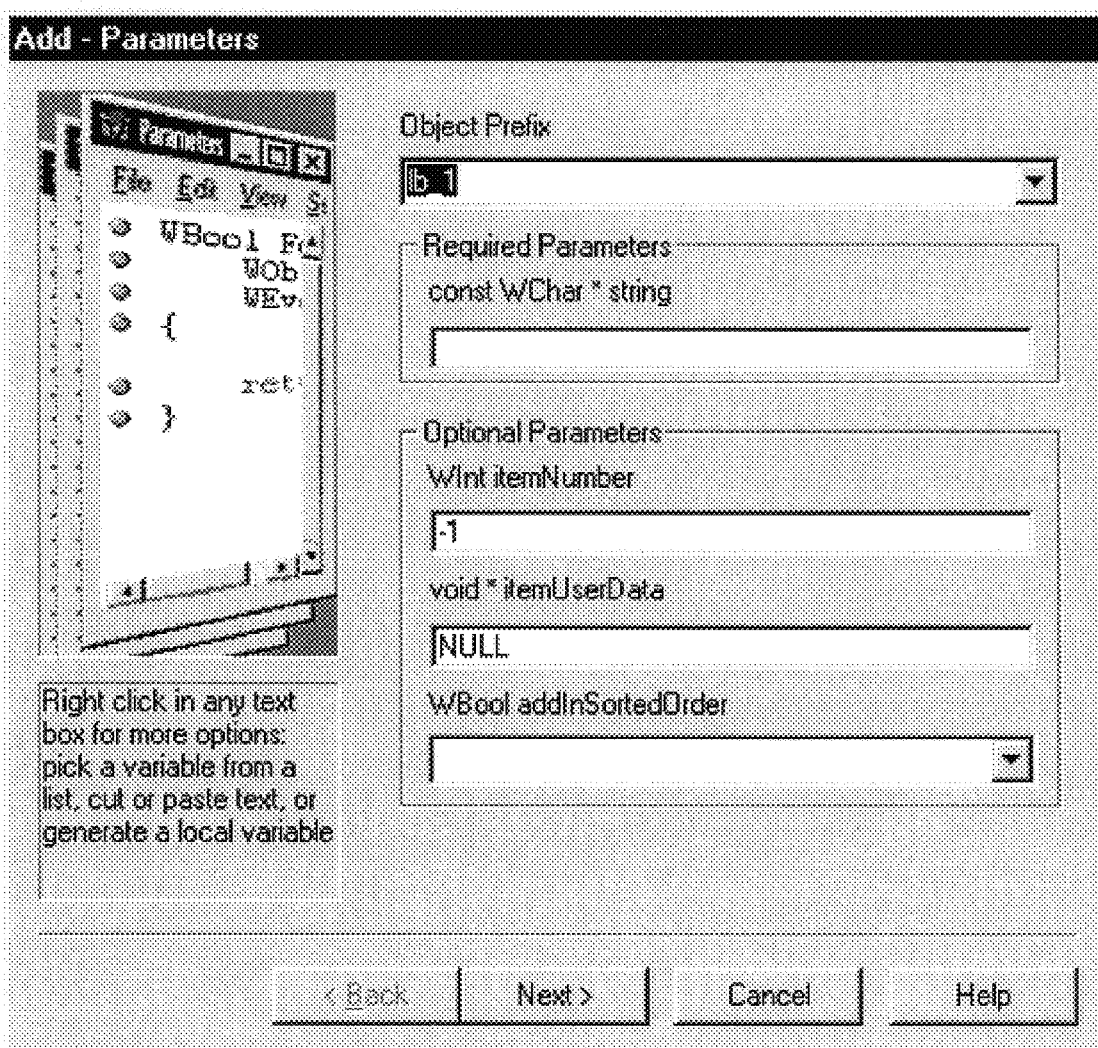

The Parameter Wizard, illustrated as Parameter Wizard dialog 520 in FIG. 5B, guides the user through the construction of function calls. This is particularly useful for complicated functions or for functions with which the user is unfamiliar. The Parameter Wizard helps the user construct a function call by showing what argument values are required. The Parameter Wizard can also store function results in a specified variable.

During use, the Parameter Wizard displays text boxes in a wizard window which lets the user enter variable names, constants, or expressions. The user can use the right mouse button to click the text box and get a list of variables that may be entered. Click on a name from this list to place that name into the text box. The user can also type in entries directly. When the user clicks Finish, the wizard pastes the constructed function call into the code editor window. The wizard also inserts declarations for any local variables that the method requires.

B. Use of Forms, Objects, and Events to Create an Application

1. Forms

As previously illustrated, a "form" is a window that the user's program can display. Creating one's program with the IDE provided by the system of the present invention is usually a matter of creating one or more forms. To create a form, the user performs the following basic steps: (1) design the form by laying out objects (buttons, boxes, and the like); (2) specify properties for each object; and (3) write C++ source code to handle the events that might happen to each object (e.g., when the user clicks a button or types text into a text box). One form can open another form. For example, if the user clicks a button on one form, the associated source code may open a second form to obtain additional information from the user. There is no limit to the number of forms that may be associated with a project.

In the system of the present invention, each form is defined as a C++ class. This has several consequences. A form is a data type, not a data object. In order to make a form appear on the user's screen, the user creates an object of the form type. One of the user's form types is designated the "main" form. The user's program automatically creates an object of this type when it starts up, to serve as the initial window that the user sees. The user can have multiple objects of the same form type. For example, suppose the user designs a form that displays the contents of a document. The user's program can create multiple copies of this form, allowing end users to examine several documents at once.

Each form class has associated properties. Some properties affect the appearance of the form (for example, its color and its size). Other properties affect the behavior of the form (e.g., whether the size of the form can be changed). When the user designs a form, he or she may specify initial values for the form's properties. These initial values are used whenever the user's program creates an object of the form class; however, the user can change many of these properties later in program execution.

Similarly, each form class has a set of associated methods. A method is a function that lets the user perform an action using the form. For example, a form has methods to examine or change the form's properties. Using the Classes window, the user can add the user's own methods to a form class. This is useful when the user wants to define a routine that can be used by other functions within the class, or when the user wants to provide controlled access to the class for objects outside the class.

2. Objects

Application creation by the user involves, at an initial stage, the placement of objects on a form. To do this, the user selects a component type from the Component palette, then clicks on the form design window to specify the position of the object. In this manner, the user can place objects, including buttons and text boxes, on the form to design what the user will see when the form appears at runtime.

a. Object Names

An object name is associated with each object on the form. For example, the system chooses names like cb__1, lb__2, and Menu__1, as default names. If the user likes, he or she can change these into more descriptive names, such as cb__OK, FileList, menuSave, and the like.

In C++ terms, the name associated with an object is a pointer to a data type associated with the type of object. For example, when the user places a command button on a form, the system might create the following declaration in the form class's C++ code.

WCommandButton * cb__1;
This indicates that cb__1 is a pointer to a WCommandButton object. The system also generates code in the form class so that the form creates an appropriate WCommandButton object for cb__1 to point to. In turn, cb__1 is declared as a protected member of the class for the form.

The user can picture a form class definition as a sequence of declarations, such as the following (which is simplified for clarity of description).

```
class Form1
{
    protected:
        WCommandButton * cb__1;
        WListBox * lb__1;
        WMenu * Menu__1;
        // and so on
}
```

The name of the form is the name of the class. The name of an object on the form is the name of a data member in the class. By default, object names are protected members of the form class and, therefore, are referenced directly by entities outside the form. If Form1 needs to affect an object on Form2, Form1 must communicate with Form2 and have Form2 do the actual work.

When a form object is created during program execution, the program allocates memory for all the objects associated with the form. For example, the creation process includes a new statement, such as the following.

cb__1=new WCommandButton;

This serves to allocate a WCommandButton object and to point the cb__1 pointer to that object. This code is generated automatically for the user by the system. Similarly, a form object is eventually destroyed, such as by executing the following code (automatically generated by the system).

delete cb__1;

This statement deletes the allocated WCommandButton object.

b. Object Methods

Each type of object has a set of associated methods. For example, a list box object has functions for adding new items to the list, deleting existing items, and the like. The following statement uses the Delete method of a list box object to delete item #3 from lb__1 (where→is the standard C++ operator for invoking a method of an object, using a pointer to that object).

WBool success=lb__1→Delete(3);

As the above example shows, methods typically return a status value indicating whether they succeeded or failed. In many cases, this is a Boolean (WBool type) value.

c. Object Properties

The properties of an object control the object's appearance and behavior. Using the above-described object inspector, the user can set the properties of an object while the user is designing the form. Some properties can also be changed as the user's program executes. For example, the user might disable the use of a command button at times when clicking that button is not appropriate. As another example, the text property of a button can be changed at runtime using appropriate function calls, such as the following. cb__1→SetText ("New text");

Here, the text property of cb__1 changes to the given string. Methods that change the value of a property have names beginning with Set; methods that obtain the value of a property have names beginning with Get. Every property has a corresponding Get method and every property that can be changed at runtime has a corresponding Set method.

3. Events

An "event" is a message received by a form or an object on a form. Events may be generated directly by the user; when the user clicks on a button, for example, a "Click" event is triggered for that button. Events may also be triggered by the code of the user's program; if Form1 creates a Form2 window, for instance, the action generates a "Create" event for the Form2 object.

Actual writing of code for a program is mainly a matter of writing C++ routines to handle events of interest. For example, the user does not have to write a "main" function for the program; that is handled automatically by the system. Instead the user writes various event handlers—routines for what happens in response to system events. Typically, a given object will have a number of associated event handlers. An event handler contains C++ code that is executed when a specific event occurs. For example, a command button is associated with a handler routine specifying what happens when the user clicks the button. This is called the button's Click event handler. Once the user has placed an object on a form, the user adds event handlers to handle events that may happen to that object.

A typical event handler is structured as follows.

Form1::cb__1__Click This incorporates the name of the form that contains the object (Form1), the name of the object that receives the event (cb__1), and the name of the event itself (Click). As the syntax of the routine name suggests, this event handler is a method belonging to the Form1 class. This means that the handler has access to all the private members of the form object and, thus, can work with all the objects defined on the form. For example, the Click event handler for cb__1 can change the contents of a list box elsewhere on the form.

Actual creation of an event handler routine for an object entails the following exemplary process. First, the user employs the right mouse button to click an object in the form design window, then to click an "Events" popup menu command. In response, the system displays a short menu of events that may occur on the selected object; the menu includs a "More" option for displaying more events. If the user clicks a specific event in the list of events, the system displays a code editor which the user can use to write a routine to handle that event. If the user clicks the More option, the system opens the previously-described Object Inspector dialog, at the Events page. This lists all the events that can be triggered on the selected object. Double-clicking by the user of any of these events opens a code editor to edit an existing event handler or create a new one. For user feedback, the list of events displays check marks beside events which already have event handlers. Some types of objects have event handlers predefined by the system.

The Object Inspector dialog lists all the possible events that can be triggered on an object. In most cases, the user can simply ignore the majority of these events. For example, there are a large number of events that may be associated with a command button. In most programs, however, the only event the user cares about is when an end user clicks on the button. The user only needs to write a Click event handler for the button, and ignore all the other possibilities.

The previously-mentioned Code Editor helps the user write source code for the handlers. Specifically, the system opens an editing window whenever the user asks to examine or modify an event handler. The same editor is used to edit many other parts of the user's project, including managed classes and header files. When the user begins writing a new event handler, the editor displays the skeleton of the routine. The initial code for a Click event handler for a command button object, for instance, is as follows.

```
WBool Form1::cb_1_Click(
    WObject *    source,
    WEventData * event )
{
    return FALSE;
}
```

The handler routine or method comprises a standard C++ function. For this example, the name of the form class is Form1. The handler takes a function name, cb_1_Click, derived from the name of the object (cb_1) and the name of the event (Click). The handler arguments comprise context information, including an event source (e.g., button object) and event data (e.g., timestamp of when the click occurred). Finally, the handler routine includes a return type, for indicating the value which it will return. For this example, the handler returns a WBool value: TRUE indicates that the function completely handled the event on its own, and FALSE indicates that the function wants to let the default event handler finish handling the event.

When the editor is first displayed, the system places the cursor on the blank line after the opening brace, {, so that the user can begin typing source code for this routine. The system also automatically places a return statement at the end of the routine, such as the following.

return FALSE;

This provides default termination for the event handler, by letting the default event handlers take care of any clean-up and other technical details associated with the event.

Creating Applications with Drag-and-drop Code Generation

A. Introduction

To facilitate creation of software programs, the system of the present invention provides methods for drag-and-drop programming/code generation. For the user's perspective, this operates as follows. The user simply drags the screen cursor from an object on the form (or the Objects window) to the Code Editor window. Alternatively, the user can invoke the Reference Card in a code editor by right-clicking on any class name or variable. This action launches a popup menu which offers to open the Reference Card for the associated class, and then insert the code using that variable.

The Reference Card itself lists all the actions the user can perform on the particular object. If the user chooses an action, the Parameter Wizard helps the user set the parameters for the operation. The actions provided through the Reference Card can set properties, retrieve their values, or execute member functions associated with an object. In many cases, setting up an operation with the Parameter Wizard only takes one step. Then, the wizard inserts the generated code in the code editor window, including declarations of any local variables required for the action. When the Reference Card is already open, the user can generate code by dragging the cursor directly from the Reference Card to the code editor.

A more detailed description of drag-and-drop programming is perhaps best presented by way of example. The following description will demonstrate use of the IDE for creating a sample program, with particular focus on drag-and-drop programming methodology of the present invention.

B. Creation of an Application

1. Use of Tools to Create an Application

Figure 6A:
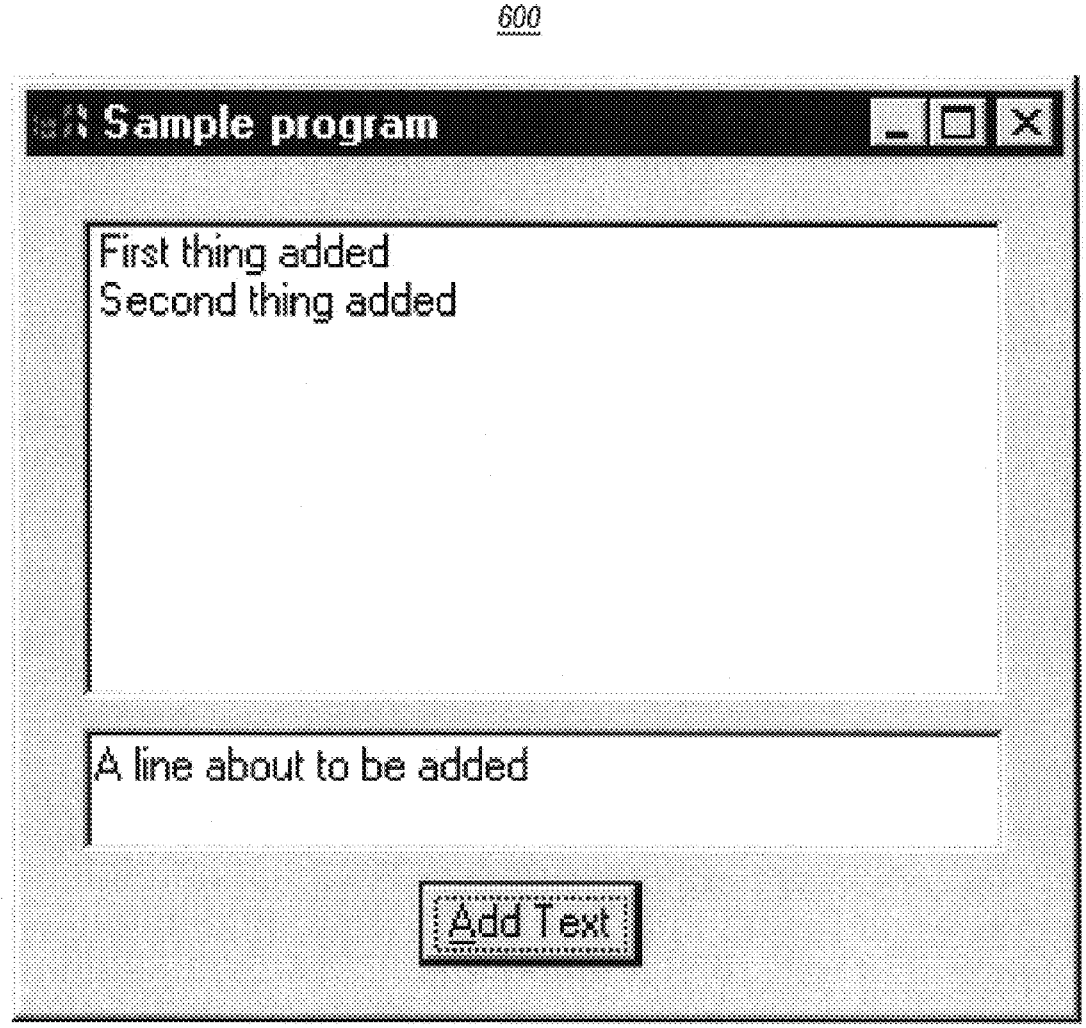
FIGS. 6A–E are bitmap screenshots illustrating a Sample Program having a list box, a text box, and a command button created by visually placing components on a form.

With the IDE provided in the system of the present invention, the user creates an application in three fundamental steps: (1) design a user interface; (2) specify the properties of the objects the user has designed; and (3) add code to handle user actions. Each step will be examined in turn. FIG. 6A illustrates a Sample Program 600, which includes a list box, a text box, and a command button. When the program is running, the end user can type a line of text into the text box, and then add that line to the list box by pushing the "Add Text" command button.

2. Creation of an Application's User Interface

To design an application's user interface, the user lays out one or more objects on the given form. The first step is to click on a type of object in the Component palette. Then the user moves the cursor to the form design area, presses and holds down the left mouse button, and continues to hold down the mouse button and drag the cursor diagonally to specify the object's position and size. If the user just clicks on the form instead of dragging, a standard sized component is added. The following will demonstrate uses of three components from the Standard page of the Component palette: List box, Text box, and Command button.

a. Adding the List Box

Figure 6B:
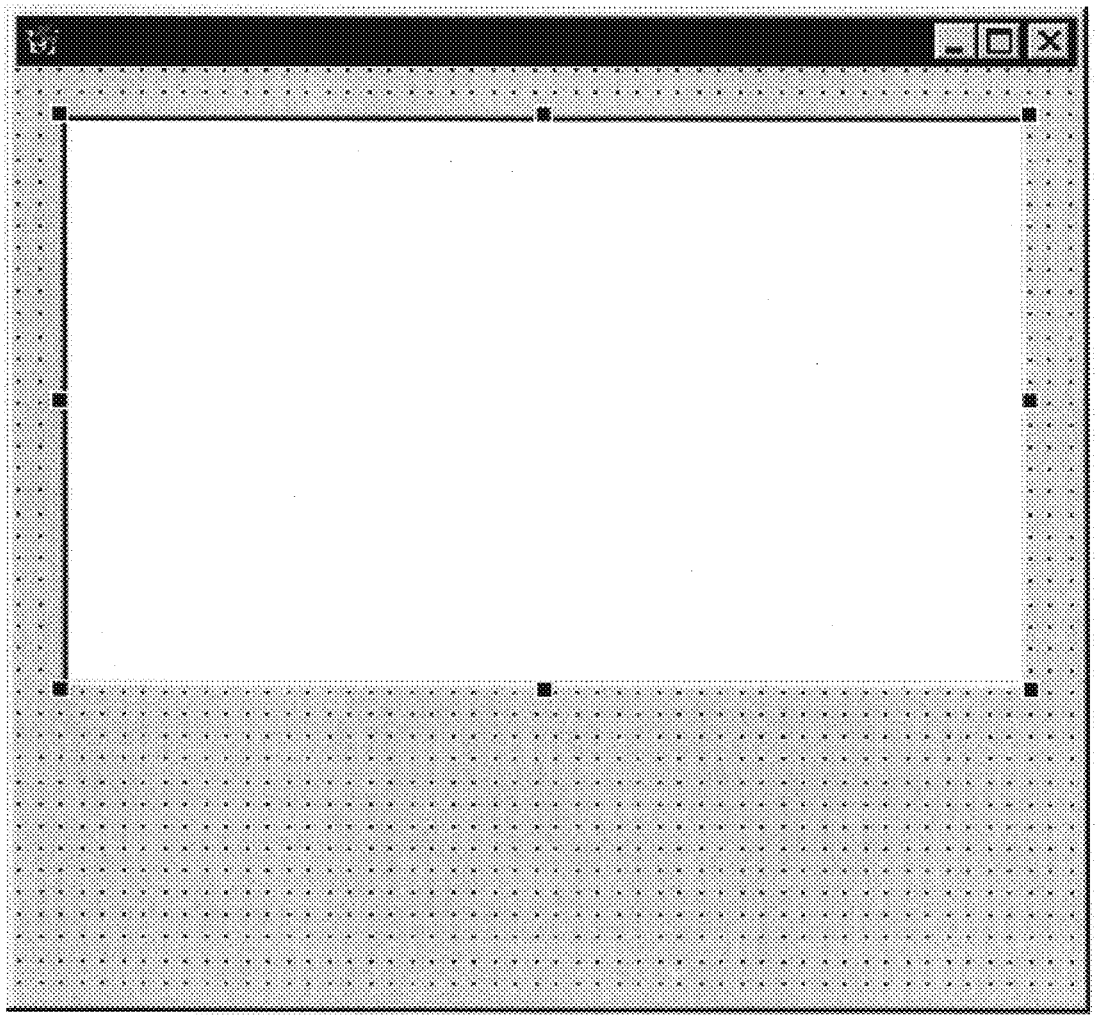

To add a list box, the user clicks the list box button (indicated by the ListBox tooltip) on the Standard page of the Component palette, and then moves the cursor to the form design window, pointing anywhere in the upper left quarter of the window. The cursor changes from an arrow to a crosshair. Now, the user holds down the left mouse button and drags the cursor diagonally across the form. While the user is dragging, a rectangular outline shows the user the size that the list box will be. Upon the user releasing the mouse button, the system creates a list box on the form, as shown in FIG. 6B. The user can move the list box by dragging it. The user can also change the list box's size, by draging one of these size handles to adjust the size of the list box.

b. Adding the Text Box

Figure 6C:
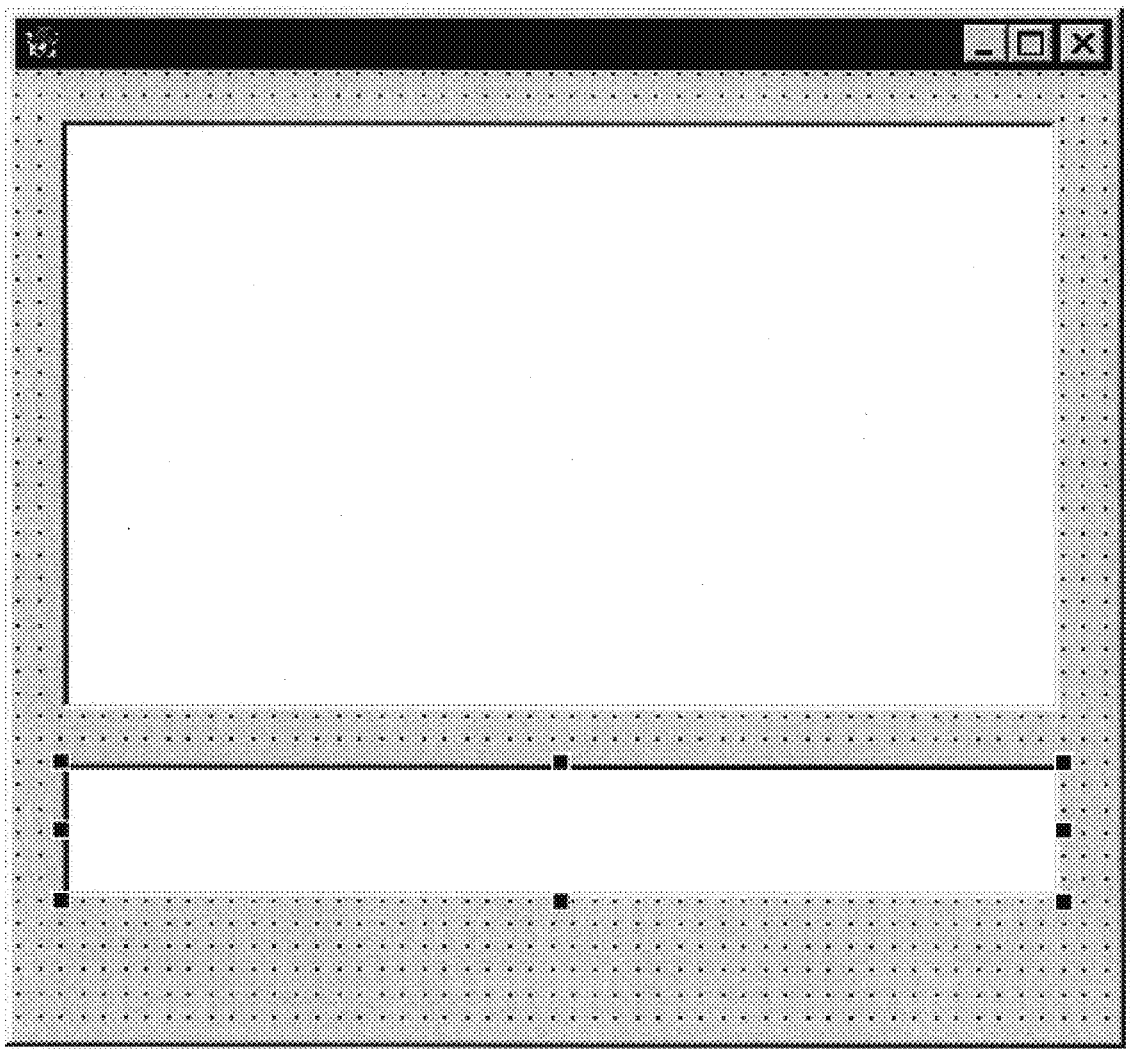

To add a text box, the user clicks the text box button (TextBox) on the Standard page of the Component palette. In the form design window, the user drags diagonally below the list box to create a text box. The form now has a list box and text box, as shown in FIG. 6C. The user can change the size and position of the text box in the same way as the list box.

c. Adding the Command Button

Figure 6D:
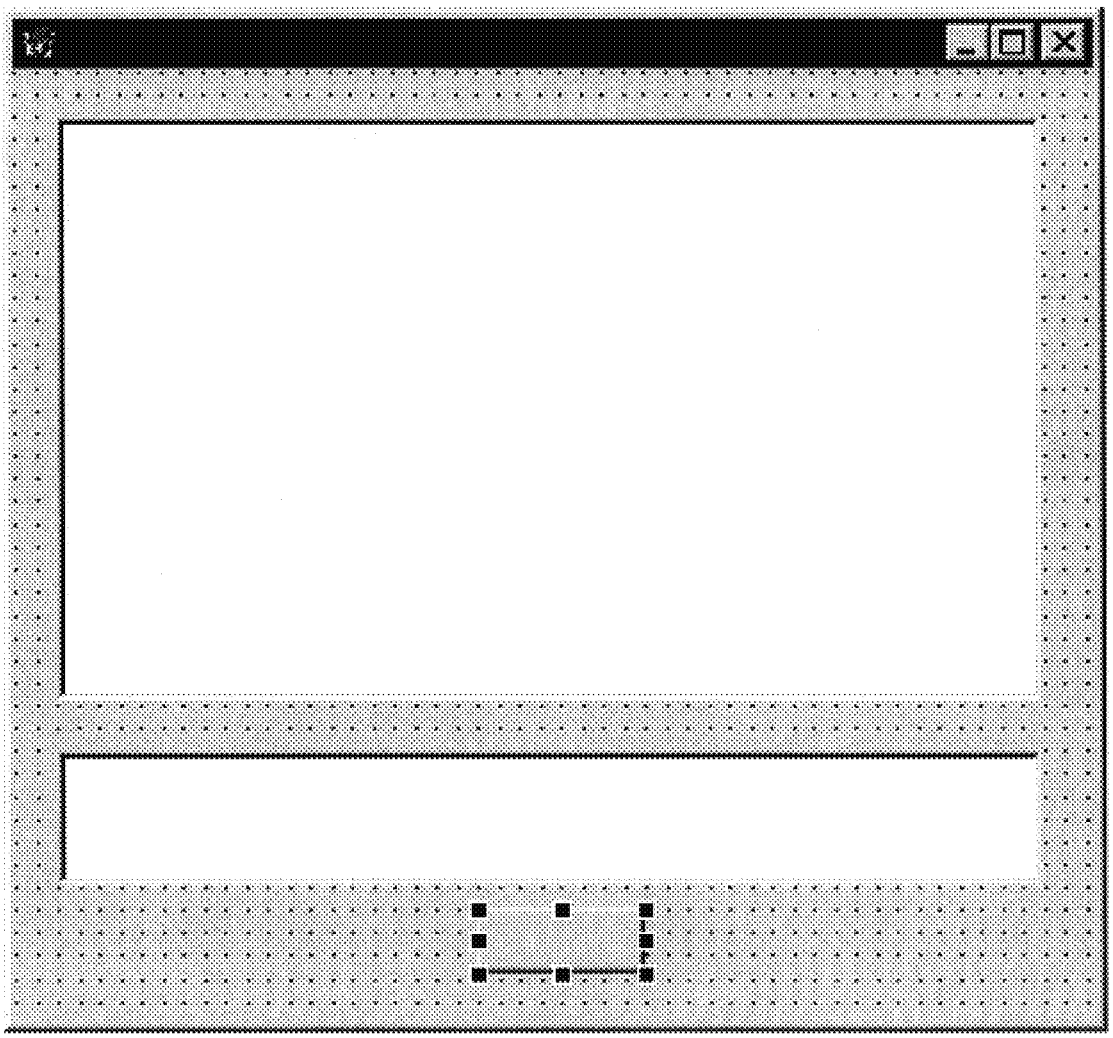

To add a command button, the user clicks the command button icon (CommandButton) on the Standard page of the Component palette. In the form design window, the user drags diagonally under the text box to create a command button. This creates a command button on the form, as shown in FIG. 6D. At this point, the user can now run the application to see the default behavior of the controls that the user has added.

3. Specifying Object Properties

Figure 6E:
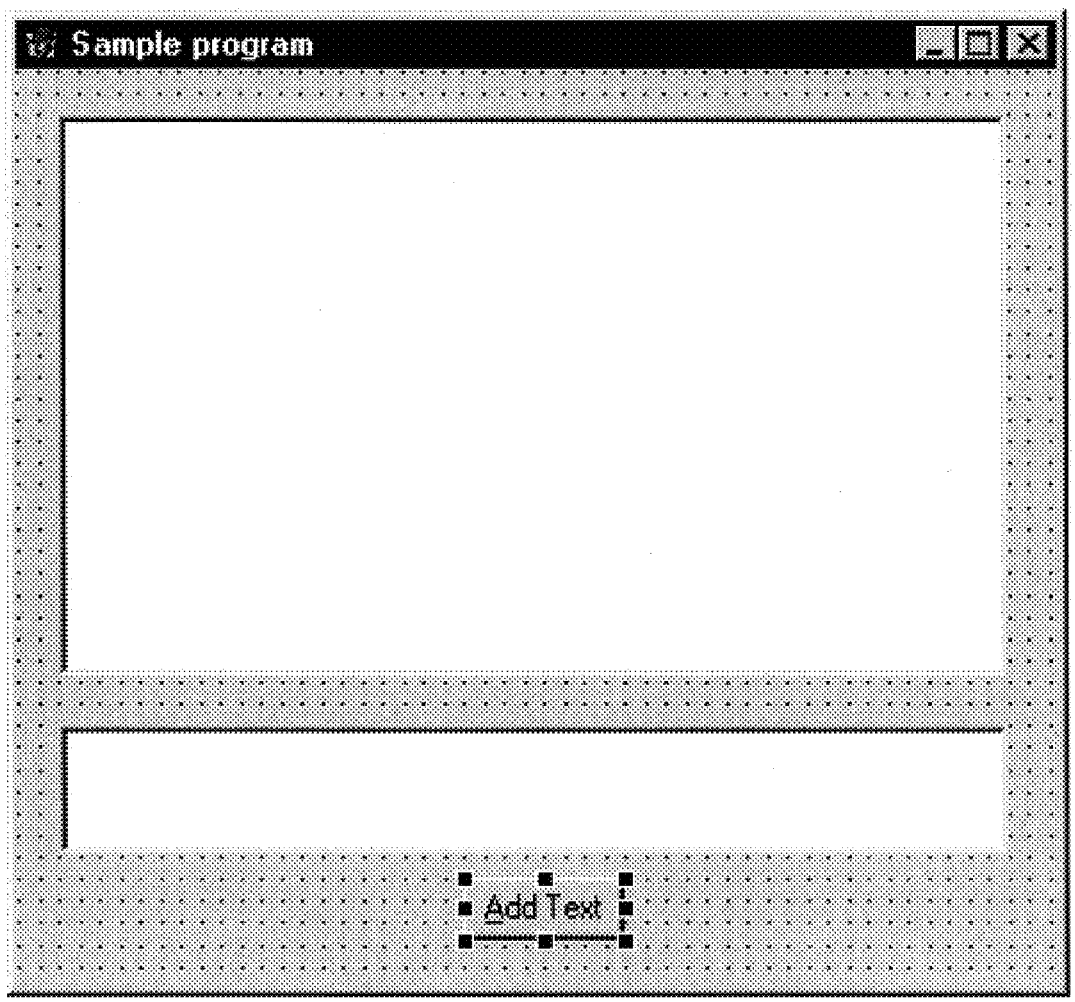

The next step in creating a program is to adjust the properties of the objects the user placed on the form. The properties affect the appearance and behavior of the objects. To begin with, the user can change the "title" which appears on the form by assigning a value to the Text property of the form. Specifically, the user employs the right mouse button to click a blank area of the form and click Properties to display the property sheet for the form. On the General page, the user clicks in the Text box, then types a new title, such as "Sample program". The user completes the operation by clicking OK. In a similar manner, the text property on the command button can be edited to explain what the button does. Here, the user employs the right mouse button to click the command button and click Properties to display the property sheet for the command button. On the General page, the user clicks in the Text box and then types "&Add Text". Placing an ampersand (&) in front of a character designates that character as an access key or mnemonic for the object. On the same page, the user clicks Default, so that the end user gets the effect of clicking the button by pressing ENTER. The operation is completed by clicking OK. The command button is now labeled. FIG. 6E illustrate the final result.

The user can use similar steps to change the properties of any object on the form. For example, the user could experiment with property sheets by changing the colors used to display the list box.

4. Adding Program Code Through Drag-and-drop Programming

The last step in creating this program is to write code that responds to user actions. For this sample program, the user will add the code that will be invoked when an end user clicks the command button. When this happens, the program retrieves the text from the text box and add the text to the list box. In particular, drag-and-drop programming features of the present invention are employed to create this code with minimal typing.

a. Command Button

Figure 7A:
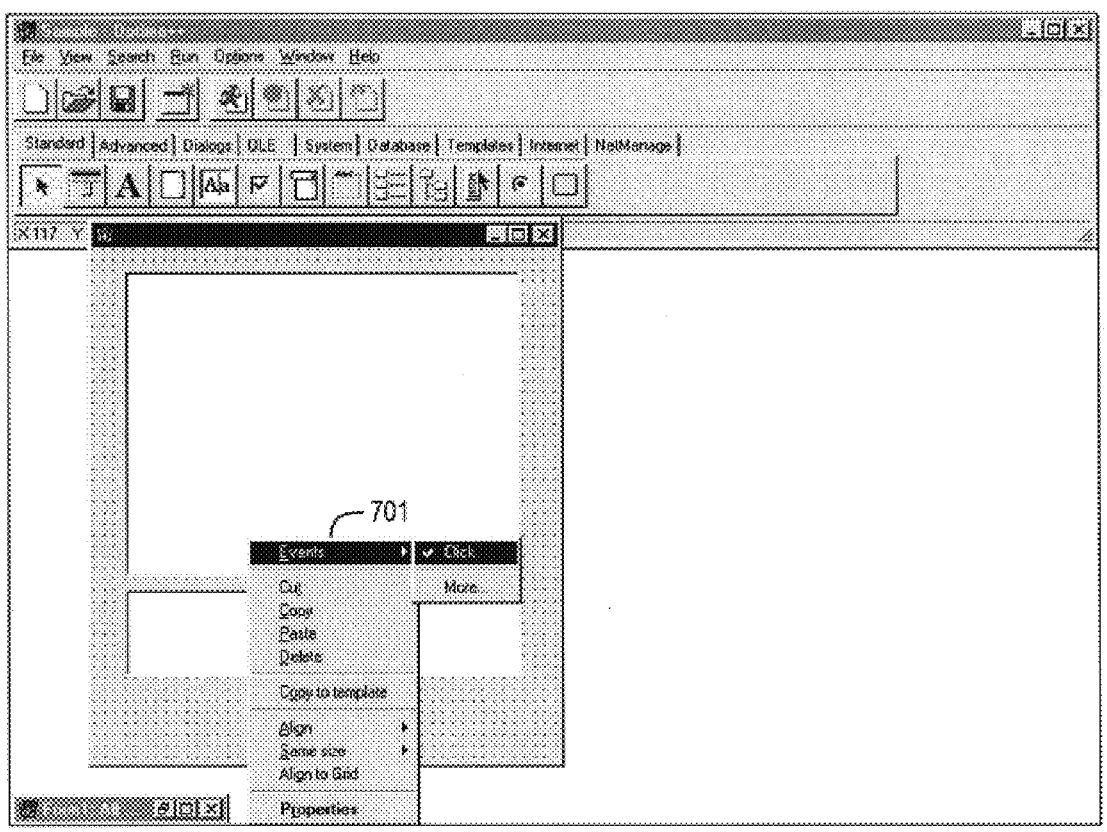
Figure 7B:
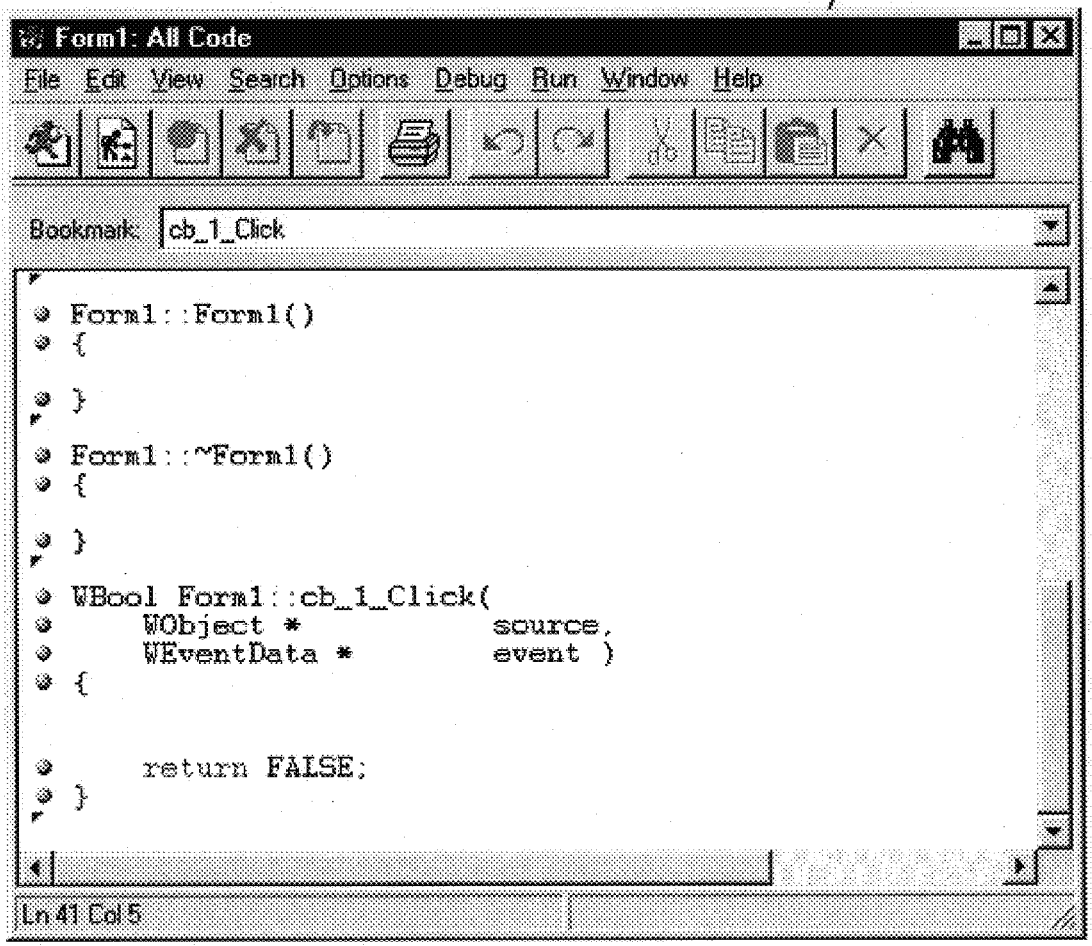

Using the right mouse button, the user clicks the command button to display pop-up menu 701, as shown in FIG. 7A. The user points to Events and clicks the "Click" menu item. As shown in FIG. 7B, this action opens a code editor window 705 for the command button's Click event handler. The user can now create the code that responds to a user clicking on the command button.

Figure 7C:
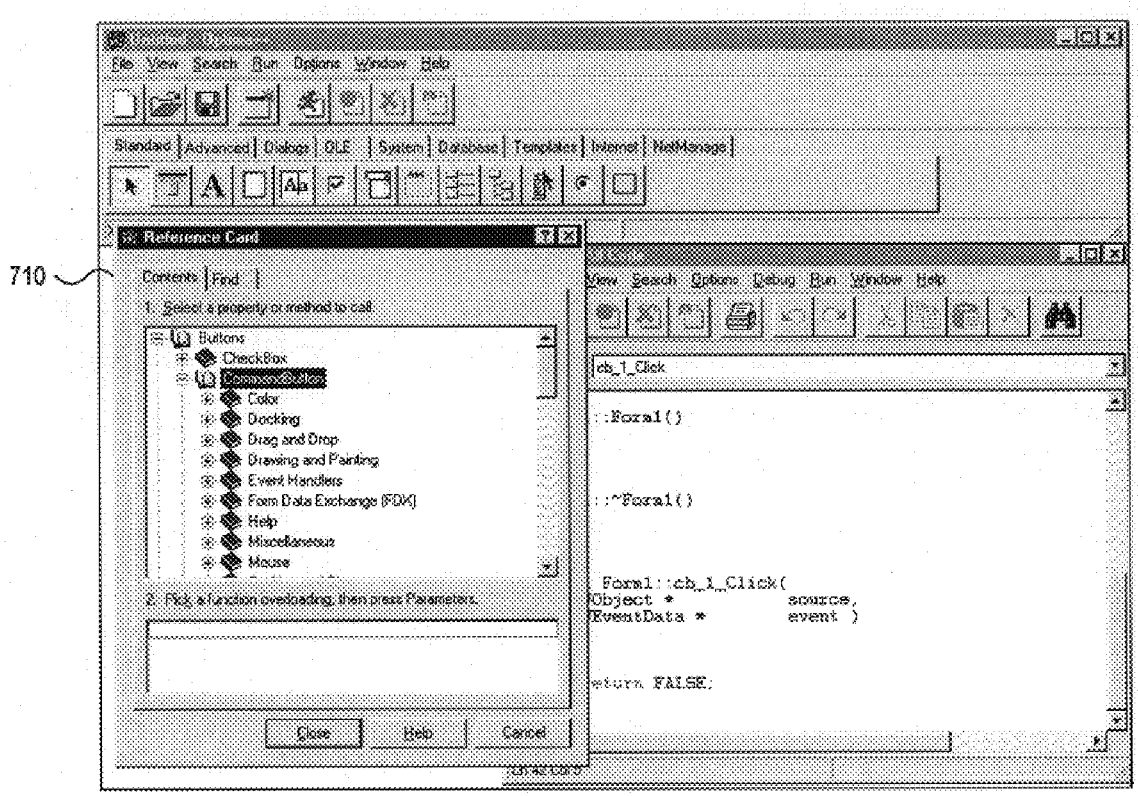
Figure 7D:
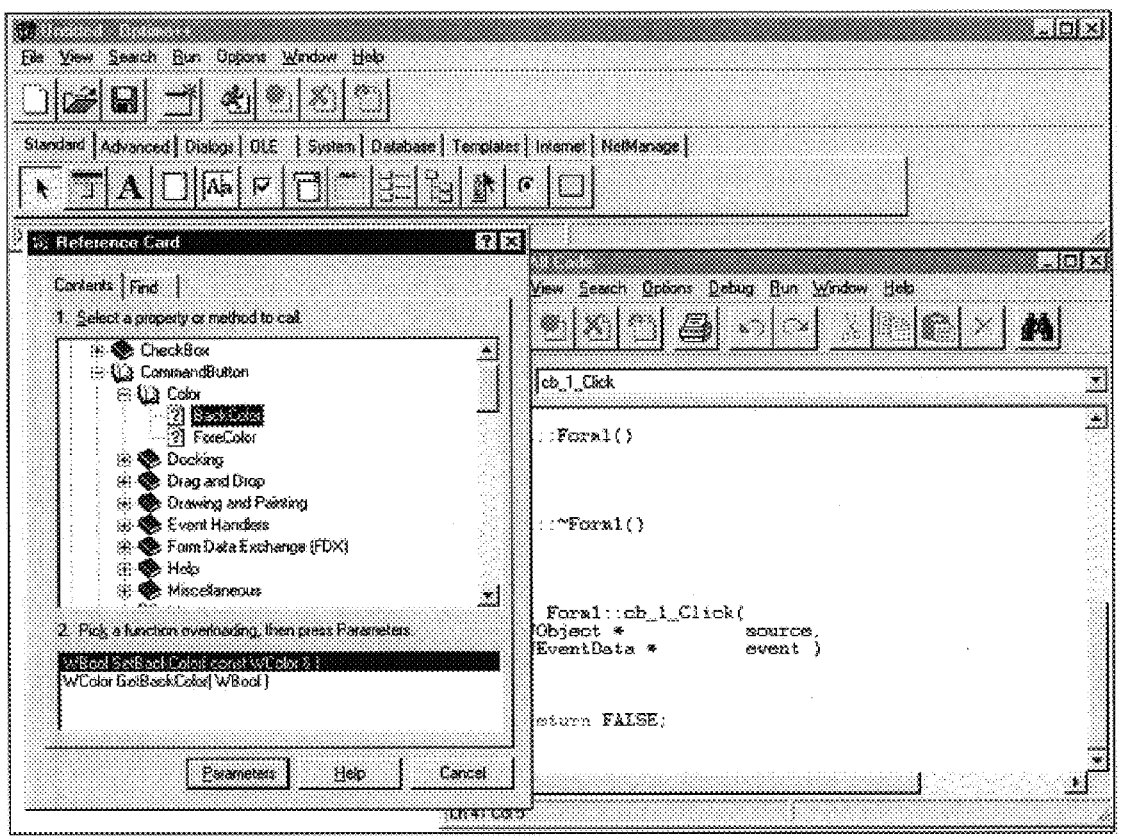

The drag-and-drop programmming feature of the present invention is employed for the command button as follows. The user drags the object that he or she wants to act on (e.g., the command button in this example), from the form design window to the code editor window where the user wants to specify an action. As shown in FIG. 7C, this action opens Reference Card (dialog) 710, which lists all the actions the user can perform on that object, as well as properties for the object. As shown in FIG. 7D, these attributes are displayed in an outline format, thus allowing easy access by the user.

Once the Reference Card is open, the user can drag from it to the code editor, instead of starting with objects on the form. The user can choose an action from the Reference Card to open the Parameter Wizard, which helps the user express that action in C++ code.

b. Text Box

Figure 7E:
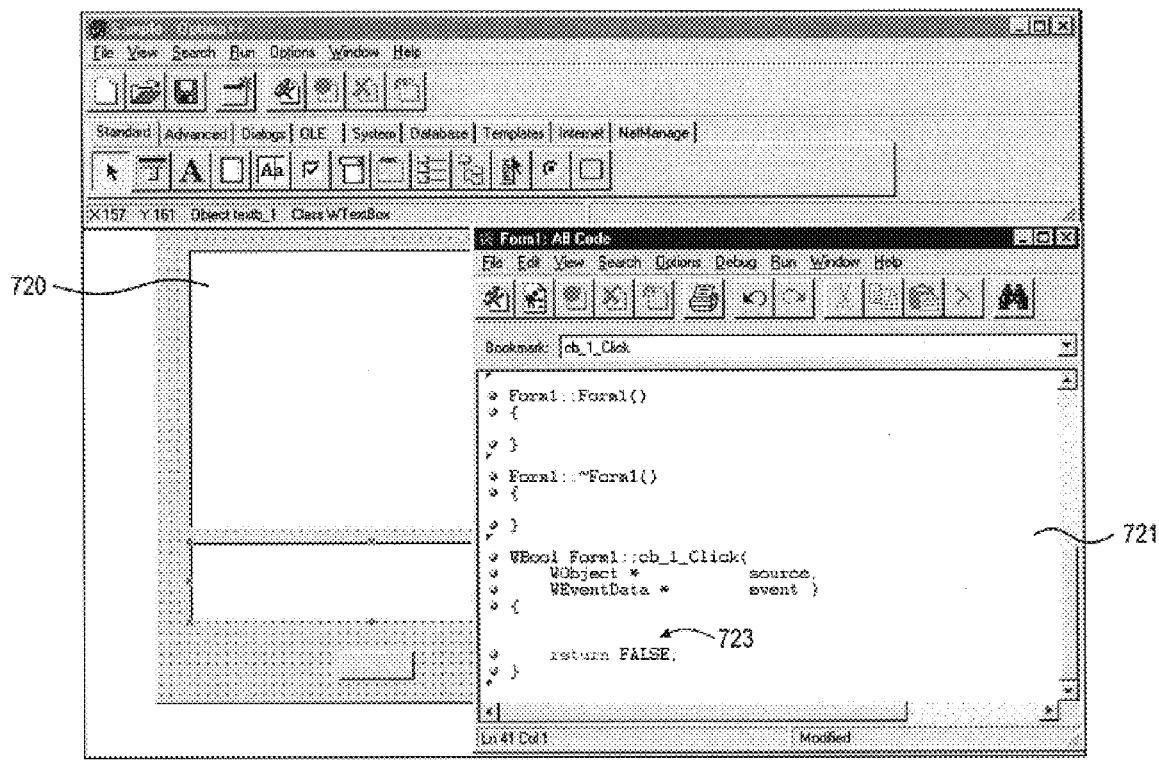

The Parameter Wizard pastes appropriate code into the code editor window. This will be demonstrated for the text box 721 in FIG. 7E. In practice, the user will typically use a combination of normal typing and drag-and-drop: typing the code the user finds easy to type, and using drag-and-drop from the Reference Card for more complicated or unfamiliar constructs. The user can also use drag-and-drop actions within the code editor to copy and move selected code, as desired.

Figure 7F:
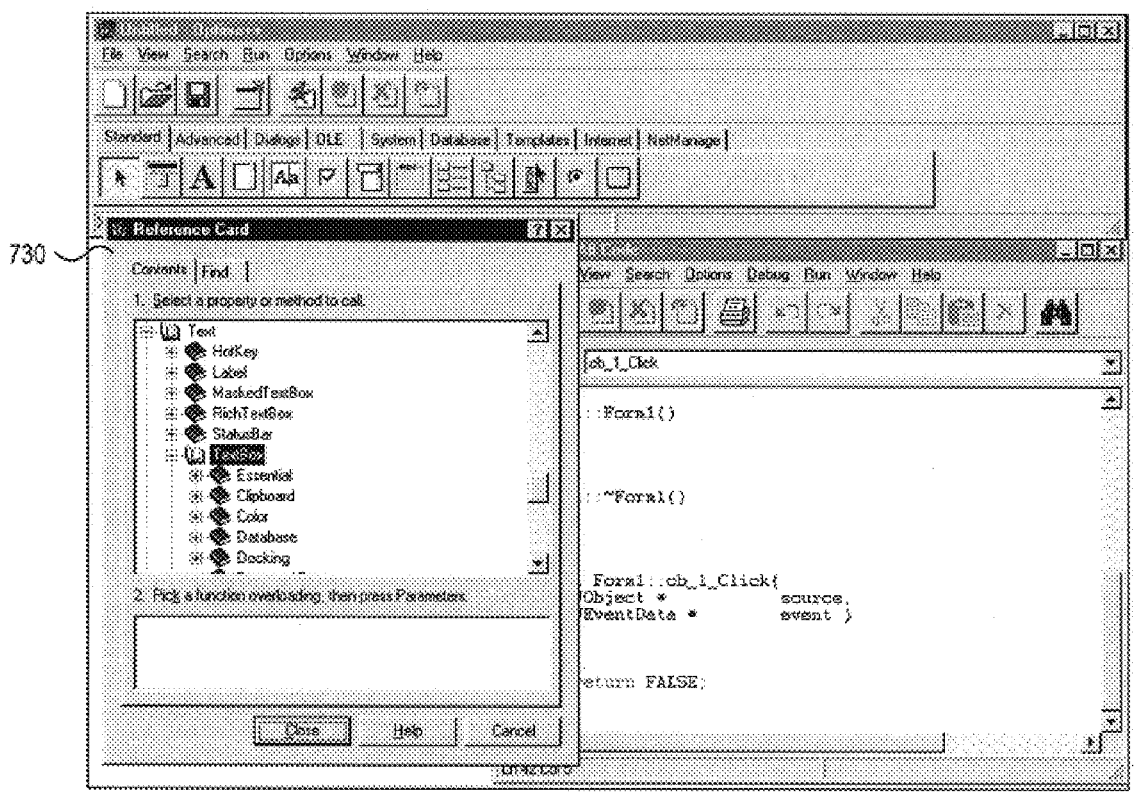
Figure 7G:
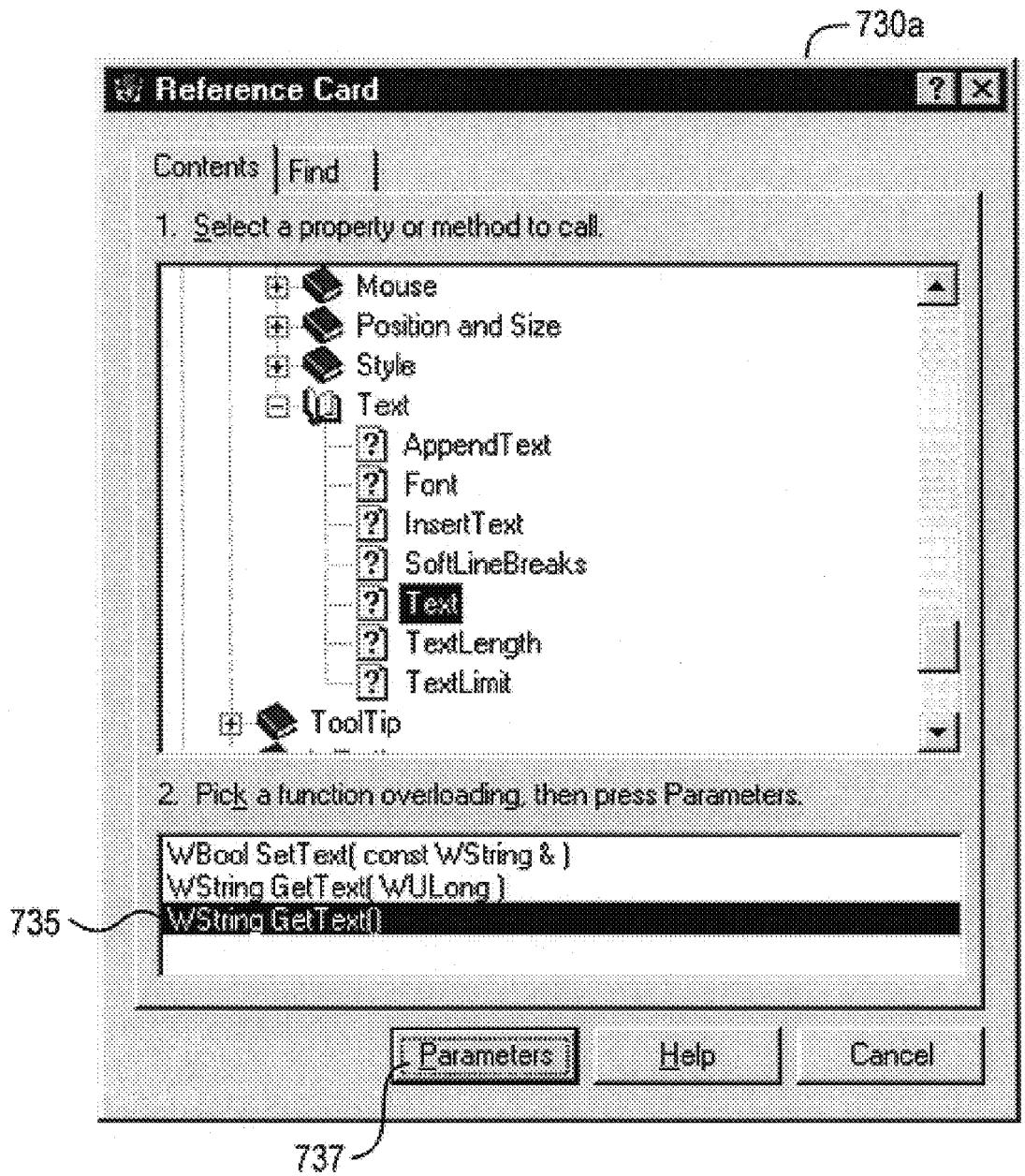
Figure 7H:
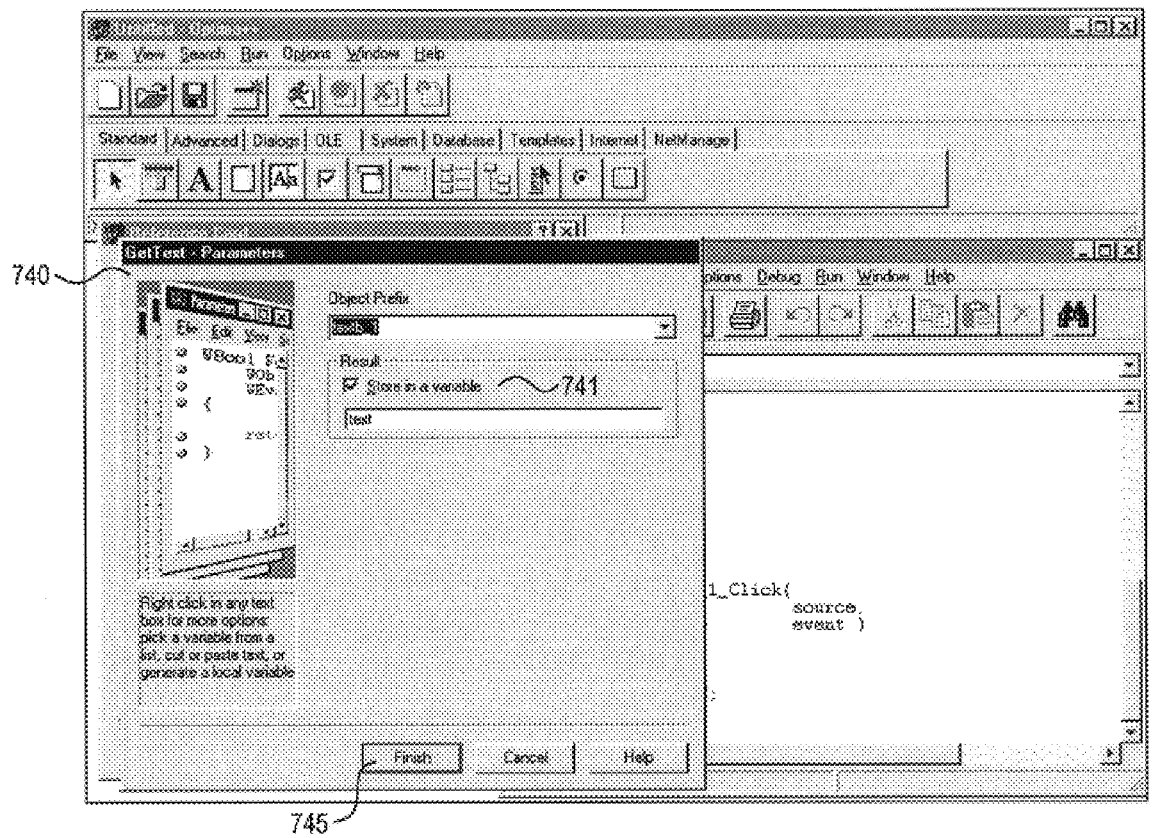

With code editor window 721 open to the "Click" event handler for cb_1, the user adds program code for the text from the text box. Specifically, the user drag from the text box 720 in the form design window to the blank line before the return statement of the "Click" event handler in the code editor window, specifically at 723. Upon the user releasing the mouse button, Reference Card 730 opens and displays a number of categories related to text boxes, as shown in FIG. 7F. As shown for the Reference Card 730 (now 730a) in FIG. 7G, the user now clicks the Text property in the Text category for TextBox, and then clicks on the line WString GetText(), at 735. The user then clicks "Parameters" button 737 to open the Parameter Wizard, shown at 740 in FIG. 7H. By making sure the "Store in a variable" checkbox 741 is checked and that "text" is the name of the variable, the user directs the program to create a variable, "text." When the user clicks Finish 745, the system generates the appropriate code in the editor. As shown in FIG. 7I, the Click event handler now has an additional variable, "text" (declared at 751) which is assigned (at 753) a copy of the string in the text box.

Figure 8A:
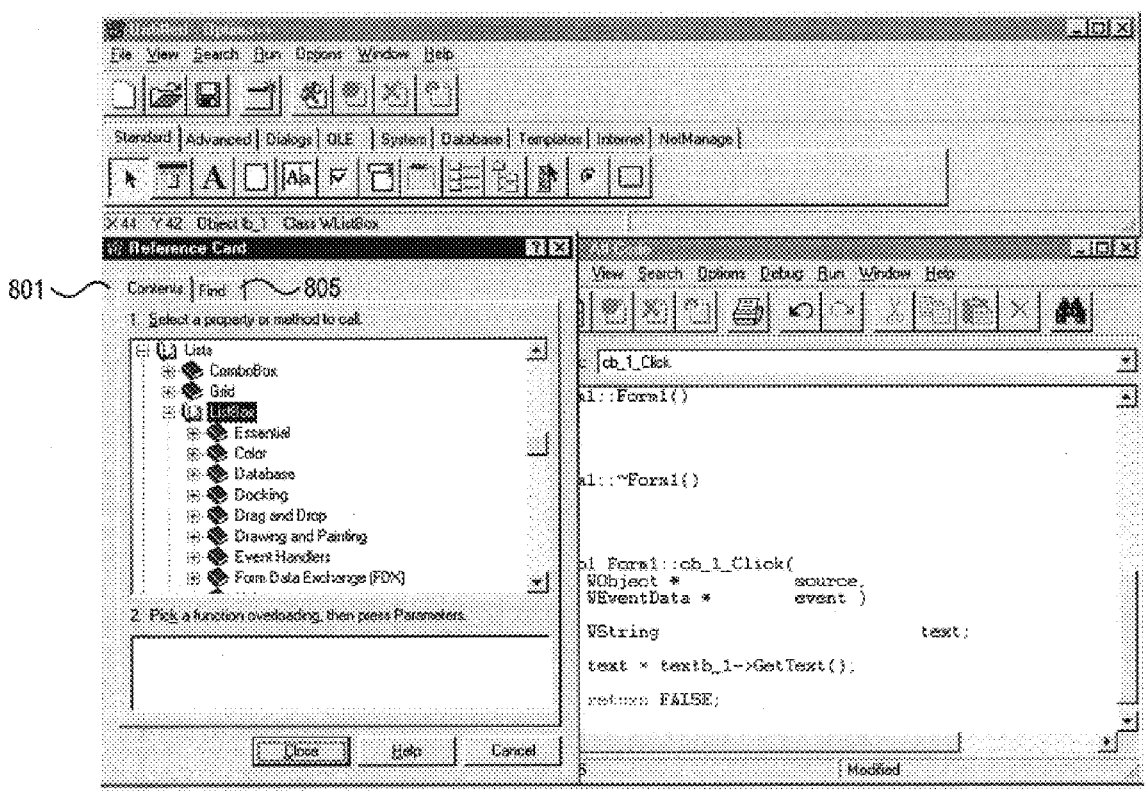
Figure 8B:
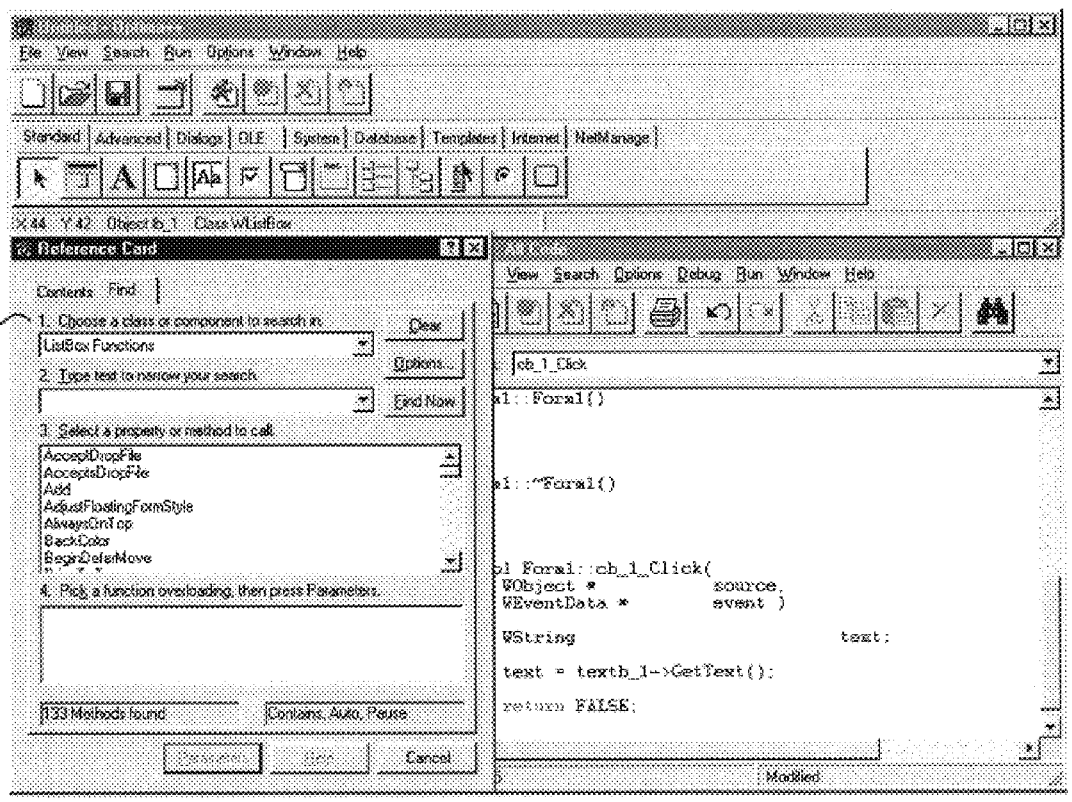
Figure 8C:
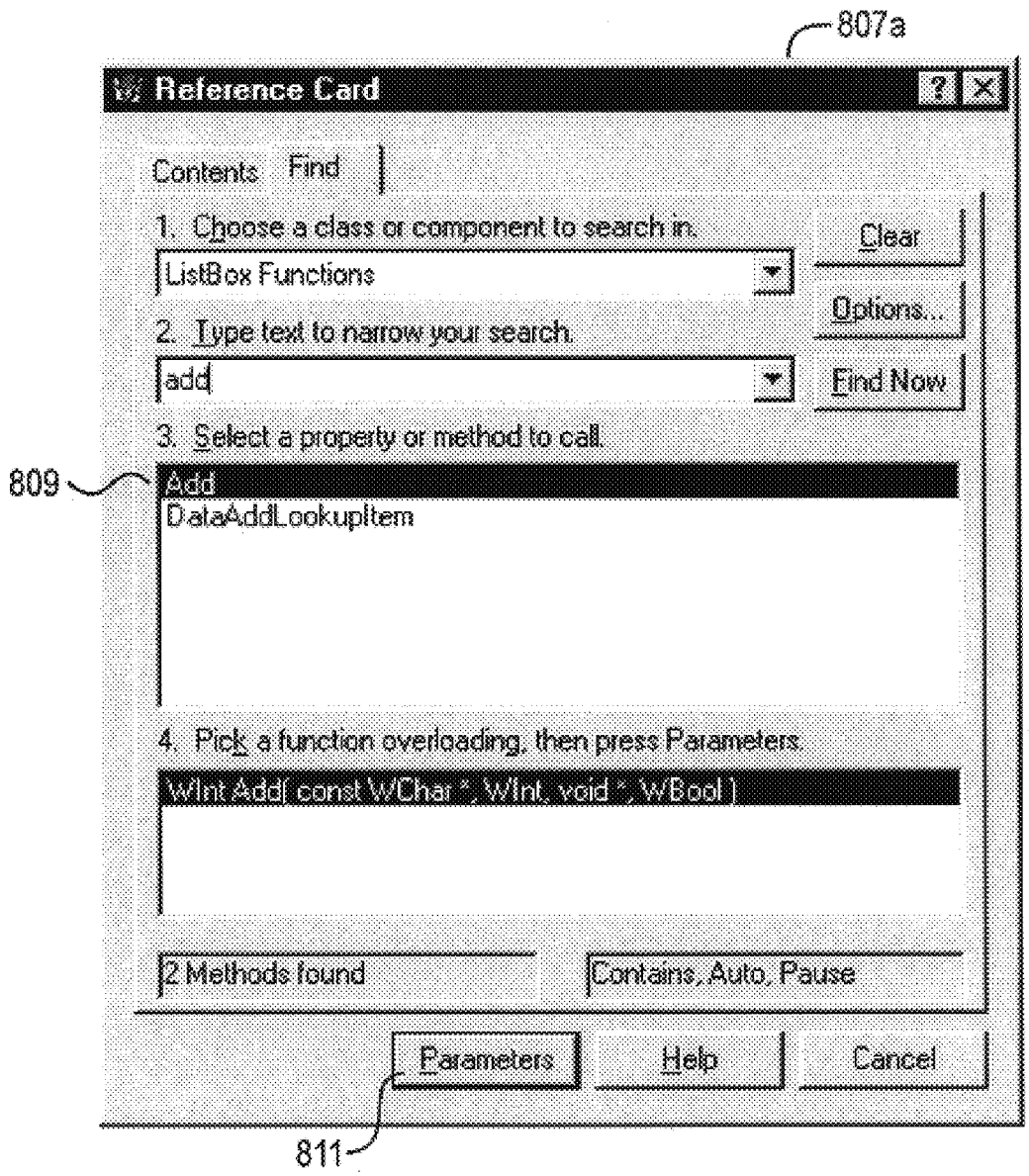
Figure 8D:
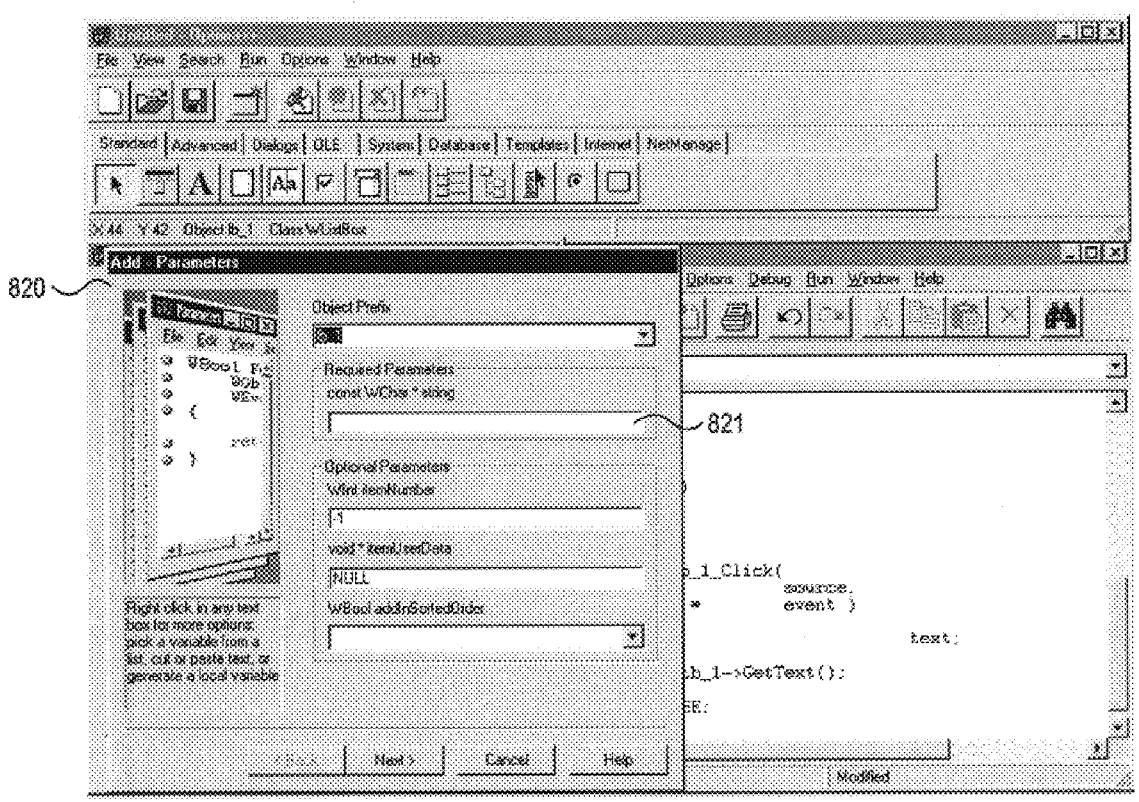
Figure 8E:
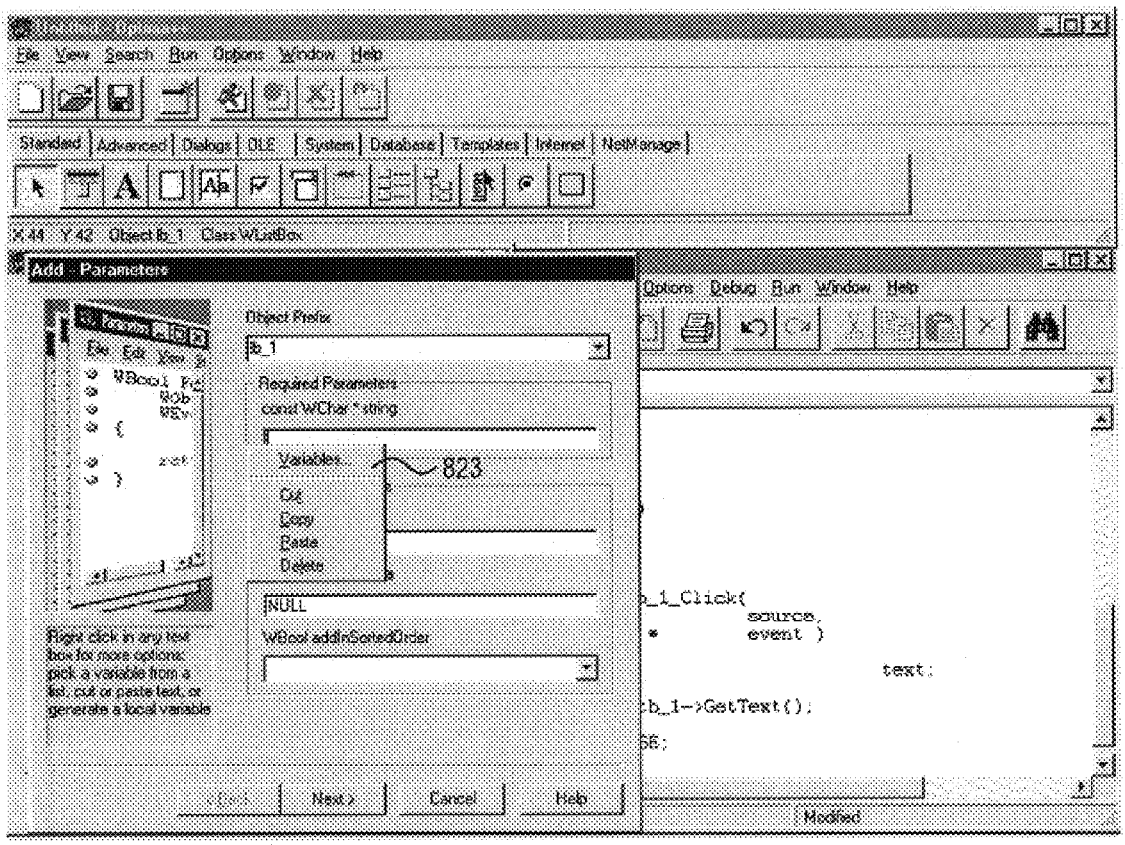
Figure 8F:
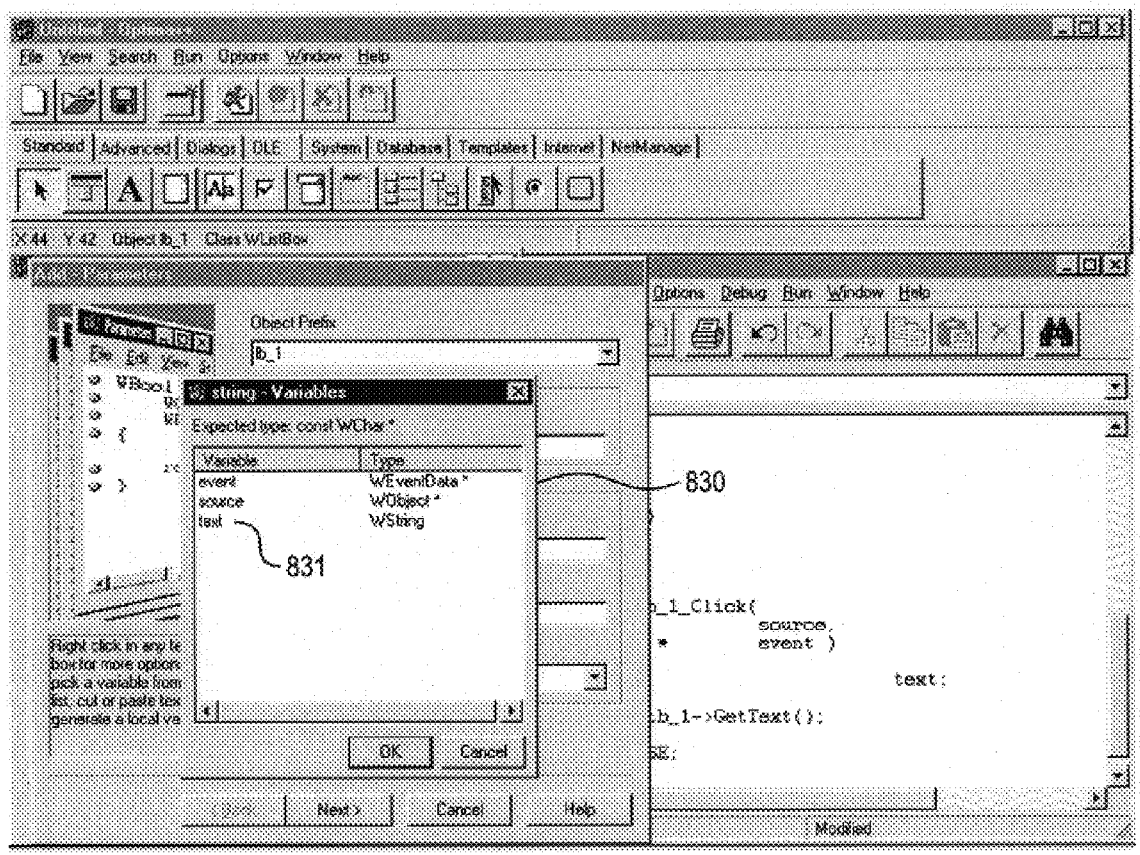
Figure 8G:
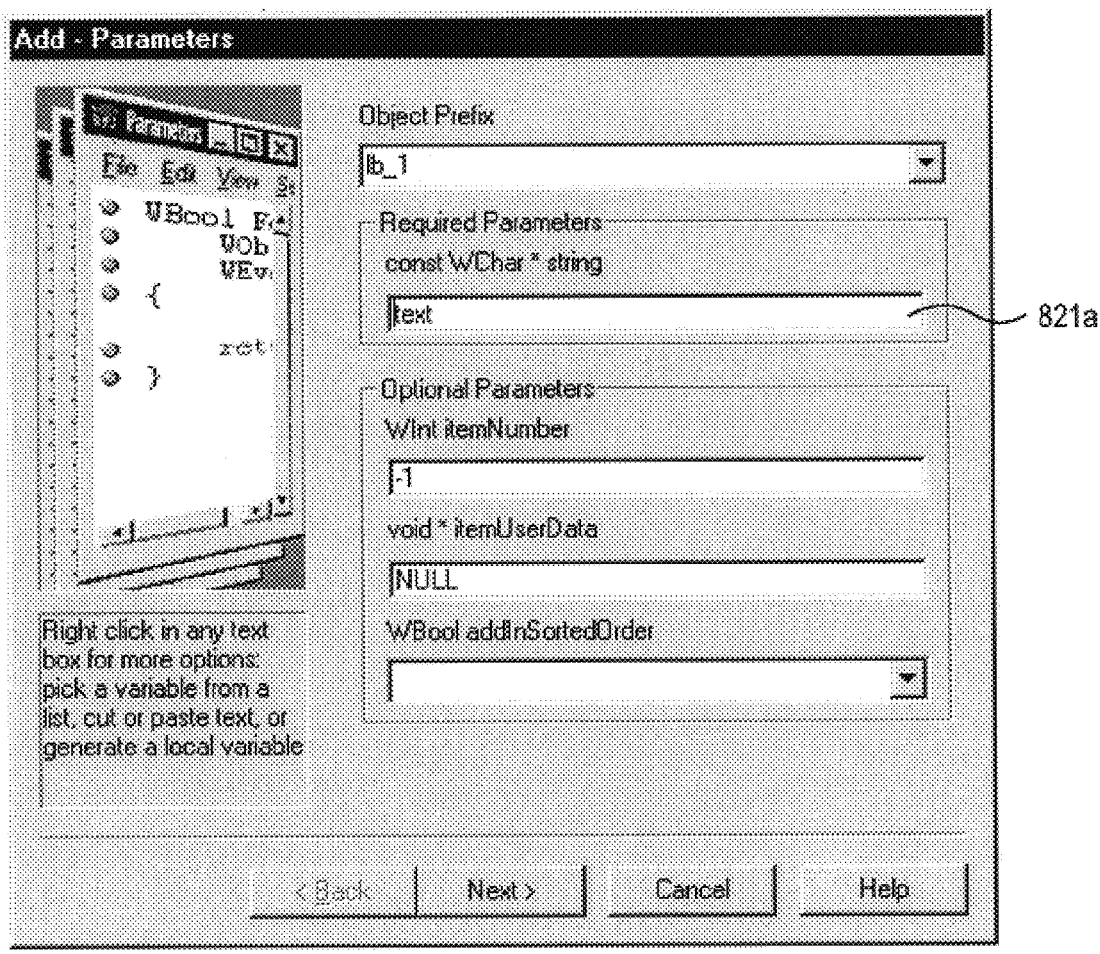
Figure 8H:
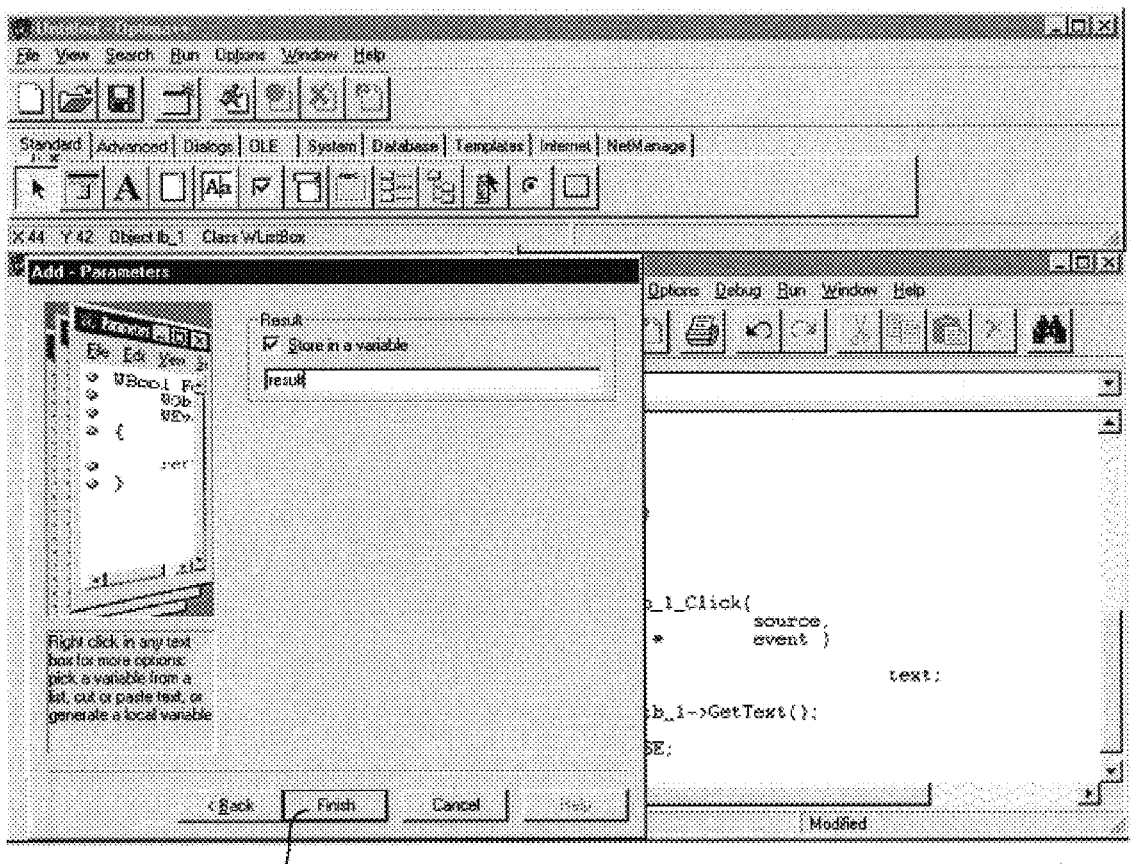

The user specifies copying of the text to the list box as follows. The user begins by dragging from the list box on the form design window to the blank line before the return statement of the Click event handler in the code editor window; this invokes Reference Card 801, shown in FIG. 8A. In the Reference Card for ListBox, the user clicks the Find tab 805. This displays Find page 807, as illustrated in FIG. 8B. In the Find page, the user types "add" whereupon the page lists only the entries containing "add". This result is demonstrated in FIG. 8C for the Find page 807 (now 807a). Now, the user clicks Add 809, and then clicks Parameters 81 1 to open the Parameter Wizard, which is shown at 820 in FIG. 8D. Using the right mouse button, the user clicks in the const WChar * string ("Required Parameters") field 821 and then clicks Variables on context menu 823, shown in FIG. 8E. This displays Variables dialog 830 in FIG. 8F. The user clicks "text" 831 (i.e., the variable holding the string) in the Variables dialog 830, and then clicks OK. This action places "text" as the required parameter in the parameter field 821 (now 821a), as shown in FIG. 8G. After the user clicks Next and then Finish 835 in FIG. 8H, the code is generated in the editor, as shown at 837 in FIG. 8I.

Using drag-and-drop methodology of the present invention, the user has created the following final code with very little typing.

```
WBool Form1::cb_1_Click(
    WObject *      source,
    WEventData *   event )
{
    WString                  text;
    text = textb_1->GetText ();
    lb_1->Add( text, -1, NULL );
    return FALSE;
}
```

5. Enhancing the Program

The simple program can be improved in several ways. For instance, the program can be modified to clear the text box after adding a new line to the list box and to check to see if the text box actually contains text; if it does not, the program can issue a warning message to the end user. Specific code that will do this work will be added to the existing Click event handler for the command button as follows.

```
WBool Form1::cb_1_Click(
    WObject *      source,
    WEventData *   event )
{
```

-continued

```
    WString              text;
    size_t               textLength;
    textLength = textb_1->GetTextLength();
    if ( textLength >0 ) {
        text = textb_1->GetText();
        lb_1->Add( text, -1, NULL );
        textb_1->SetText( "" );
        textb_1->SetFocus ( TRUE );
    } else {
        msg_1->Info( NULL, "Oops", "No text to add!" );
    }
    return FALSE;
}
```

Figure 9:
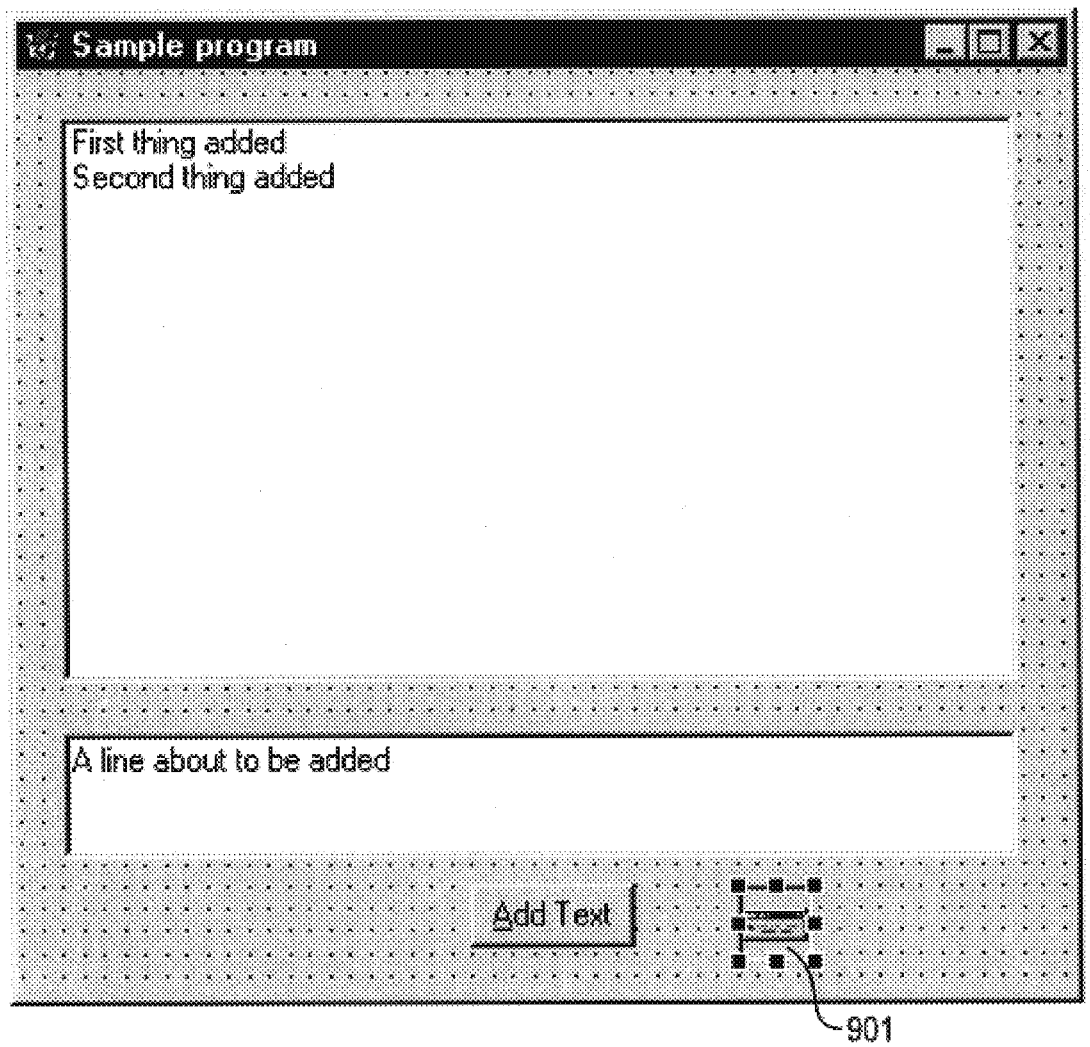
FIG. 9 is a bitmap screenshot illustrating the user adding a message box button from the Component palette to the Sample Program.

Since the user wants to issue a warning message if the text box is empty, the user adds a message box to the user's form from the Component palette. The specific steps are as follows. The user clicks the Dialogs tab of the Component palette, and then clicks the message box button in the Component palette. In the form design window, the user clicks in any area of the form to add a message box object 901 to the user's form, as shown in FIG. 9. When the program runs, the user will not see the object—the picture of the object on the form merely tells the user that the form has an associated message box item that the user can use for displaying messages to the user.

The code to determine if there is text in the text box is generated as follows. The user drags from the text box on the design form to the line in the code editor window after the declaration of text. This opens the Reference Card for TextBox objects. In the Find page, the user types "text" and clicks TextLength. Now, the user clicks size_t GetTextLength(), then clicks Parameters. The user accepts the default choices in the Parameter Wizard to store the result in a variable called textLength. Upon the user clicking Finish, the system generates the code in the editor. The editor window now contains a declaration for textLength and assigns the result of GetTextLength to textlength.

Code to check for a non-zero string length is created as follows. After the GetTextLength line, the user types the following.

if (textLength>0){

The code in the editor window appears as follows.

```
WBool Form1::cb_1_Click(
    WObject *     source,
    WEventData *  event )
{
    size_t               textLength;
    WString              text;
    textLength = textb_1->GetTextLength();
    if ( textLength > 0 ) {
        text = textb_1->GetText();
        lb_1->Add( text, -1, NULL );
        return FALSE;
}
```

The "if" statement checks whether the length is greater than zero. If it is, the user's code can obtain the text that the user typed.

To add code to clear the text box, the user proceeds as follows. First, the user drags from the text box to the blank line after the Add statement in the code editor window. This opens the Reference Card for TextBox. In the Find page for TextBox, the user types "text" (if it is not already there) and clicks Text. Next, the user selects WBool SetText(const WString & ), then clicks Parameters to open the Parameter Wizard. By typing two double quotes in the const WString & text, the user specifies an empty string. Upon the user selecting Finish, the system generates code in the editor. The editor now has code to clear the text box.

Code for returning the focus to the text box is added as follows. In the Help menu, the user clicks "Reference Card". In of the Find page for TextBox, the user types focus. Then, the user clicks Focus and then double-clicks WBool SetFocus(WBool). The user now clicks the arrow of the ObjectPrefix dropdown list, and then click textb_1. This is followed by clicking the arrow of the WBool focus dropdown list, then clicking true. Clicking Finish generates the code in the editor. The editor now has code to set the focus to the text box.

An else clause is added in the code editor by simply typing

} else {

Now the user adds code to display a message if there is no text in the text box as follows. The user drags from the message box to the code editor window to switch the Reference Card to MessageBox. In the Find page for MessageBox, the user types info, then double-clicks on Info and double-clicks on void Info(WWindow *, . . . ) to open the Parameter Wizard. Now the user types NULL in the WWindow * parent text box. This specifies that the message box does not have a parent window. The user will not be able to use other parts of the application while the message box is open. Strings for the message and caption can now be added. For example, the user can type "Oops" (including quotes) for consi WChar * caption, and type "No text to add!" (including quotes) for const WChar * format. The user clicks Finish when done.

In the code editor, the code is completed when the user types a closing curly brace (}), and then starts a new line. This yields the following final code.

```
WBool Form1::cb_1_Click(
    WObject *     source,
    WEventData *  event )
{
    size_t               textLength;
    WString              text;
    textLength = textb_1->GetTextLength();
    if ( textLength > 0 ) {
        text = textb_1->GetText();
        lb_1->Add( text, -1, NULL );
        textb_1->SetText( "" );
        textb_1->SetFocus( TRUE );
    } else {
        msg_1->Info( NULL, "Oops", "No text to add!" );
    }
    return FALSE;
}
```

Figure 8J:
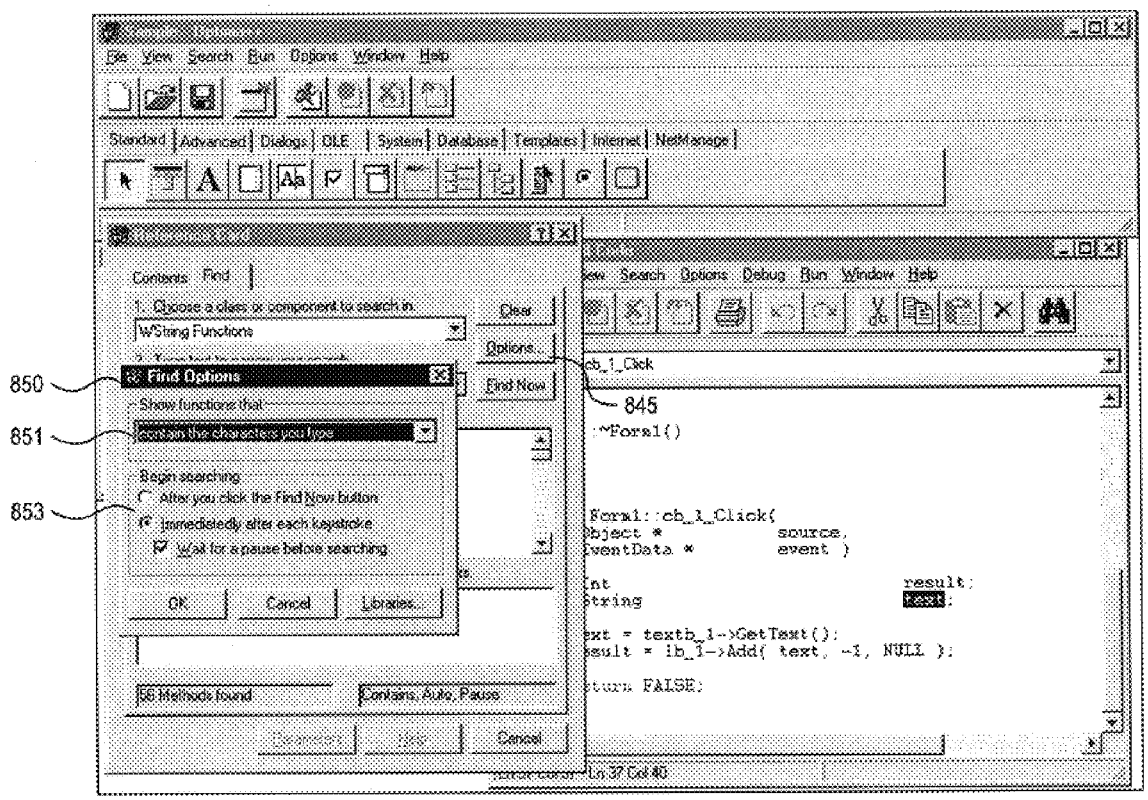
Figure 8K:
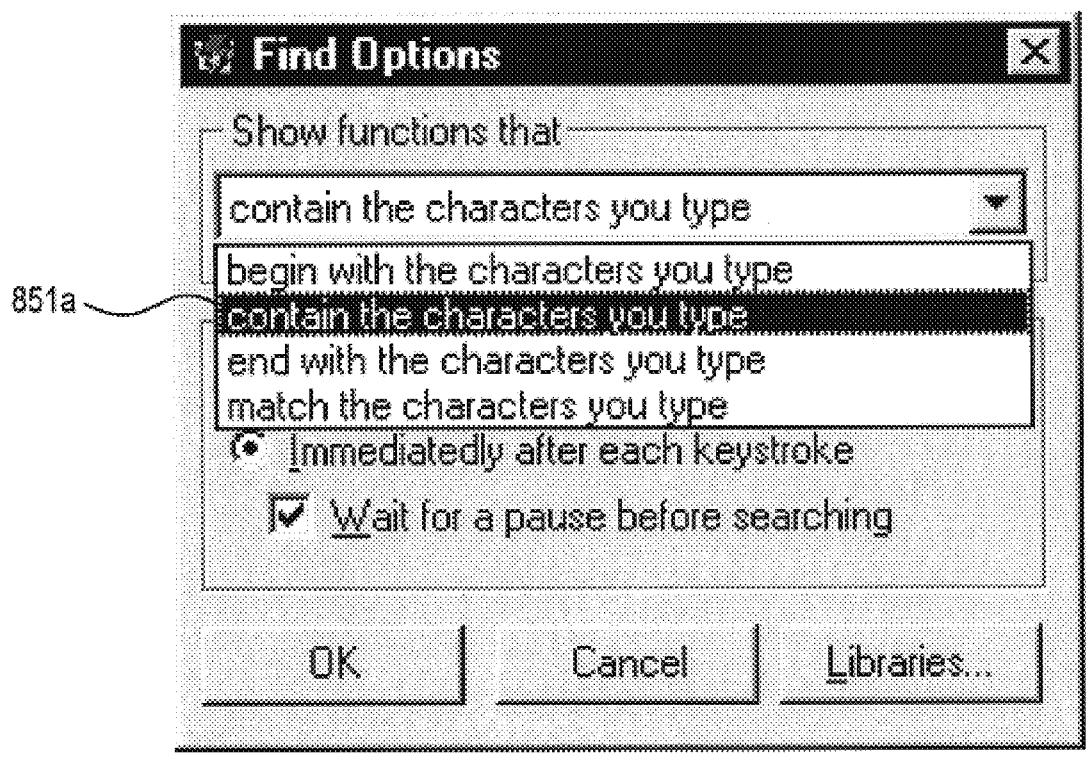

If desired, during use of the Find page of the Reference Card the user can invoke a Find Options dialog for controlling behavior of the Reference Card. As illustrated in FIG. 8J, the user invokes this dialog by selecting Options button 845. In response to this selection, the system displays Find Options dialog 850, as shown. The Find Options dialog 850 of the Reference Card allows the user to control what components are shown and how the Find Page of the reference card responds to user input. In particular, the dialog 850 includes a ComboBox 851 defining which functions are shown and radio buttons 853 defining when the system begins searching. As illustrated in FIG. 8K, ComboBox 851 (now 851*a*) allows the user to specify any of the following filtering options: a) show all functions that begin with the typed text; b) show all functions that contain the typed text; c) show all the functions that end in the typed text; or d), show all functions that exactly match the typed text.

As well as controlling how filtering is done, the user can specify when the index list should be refilled using the typed text. The user can specify that the list is only filled when the "Find Now" button is pushed (for example on a slower machine), or that it should be refilled on every character pressed. If the latter option is picked, then the user can also request that the Reference Card delay for a short time after the character press before refilling. This is the default, and gives good feedback when the user enters a long string quickly. Finally, the Find Options dialog allows the user to control what component libraries are included in the function list; there are up to three component libraries installed with the system (i.e., Optima++, for developer, professional, and enterprise components), and each ActiveX that is added is in a separate component library. This option allows users to narrow the focus of their interest to a few component libraries, or to exclude component libraries that are not currently interesting.

C. Internal Operation

Figure 10:
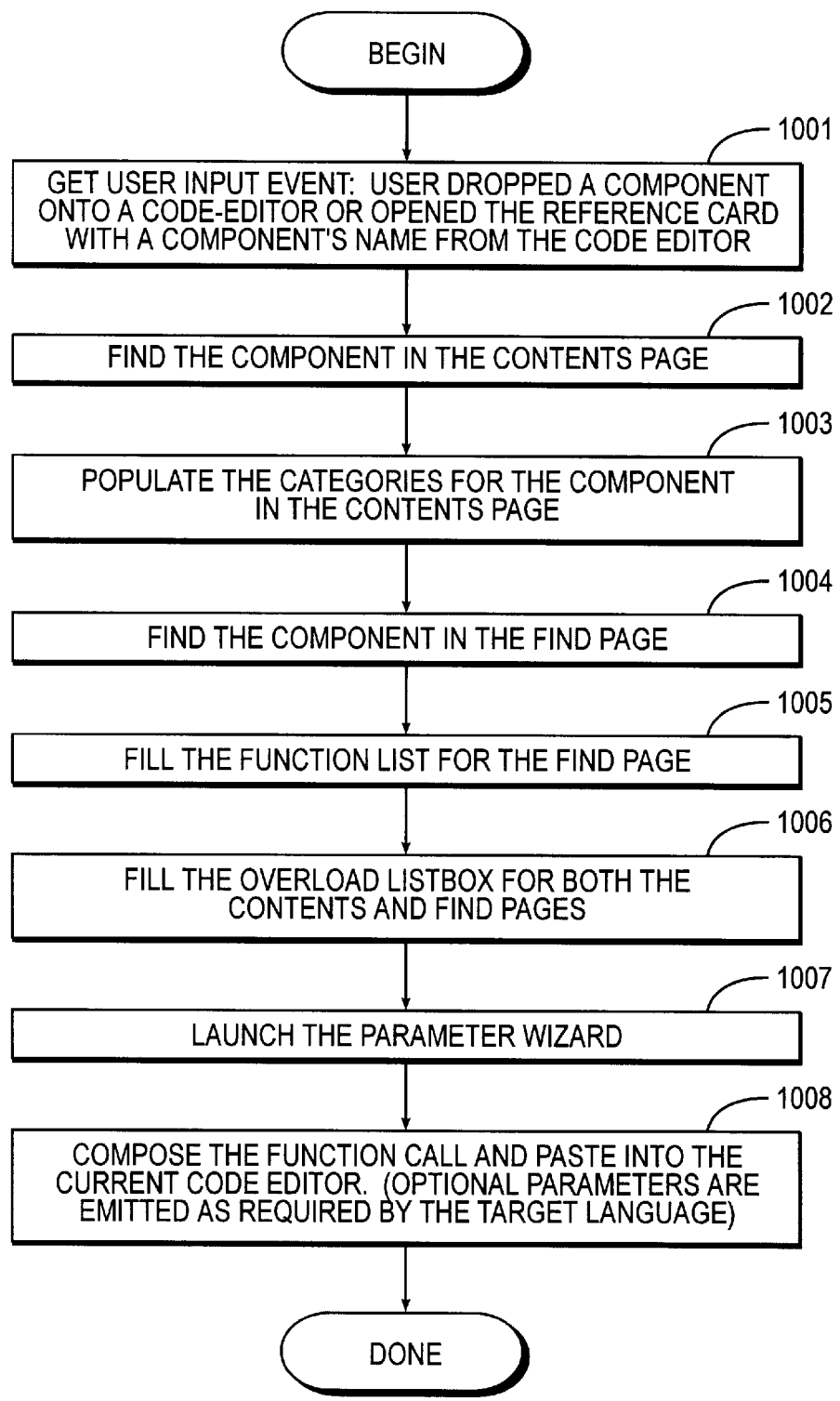
FIG. 10 is a flowchart illustrating internal operation of the system of the present invention for supporting drag-and-drop programming.

FIG. 10 presents method steps which illustrate the internal operation underlying the Reference Card and Parameter Wizard methodologies of the present invention. At step 1001, the system receives a user input event: the user has either dropped a component onto a code-editor or has opened a Reference Card with a particular component's name from the code editor. In response, the system finds MetaObject—a data block storing context information—which is associated with the requested component. A pointer to the data block is stored in component, a pointer variable.

The MetaObject data structure (class) itself may be derived, for instance, from the following class, MMComponent.

```
class METACLASSDEF MMcomponent : public MMCommon {
    public:
        MMComponent ( const MMComponentData * );
        MMComponent() { }
        // other details elided. . .
        virtual WConstantString      GetRefTag() const;
        virtual const MMComponent *  GetBase() const;
        virtual const MMReferenceNode * GetReferenceRoot() const;
        virtual WUInt                GetNumProperties() const;
        virtual const MMproperty *   GetProperty( WUInt idx ) const;
        virtual WUInt                GetNumMethods() const;
        virtual const MMMethod *     GetMethod( WUInt idx ) const;
};
```

The MetaObject class derives from the MMComponent class (which includes details not relevant to understanding the Reference Card). The implementation of the data for the MMComponent class, which is stored in an MMComponentData structure in a read-only memory segment, is illustrated by the following snippet.

```
//------------------------
enum MMComponentDataSets {
    MMCDS_Events,         //(const MMEventData *)
    MMCDS_HotEvents,      //(const MMEventData *)
    MMCDS_Styles,      //(const MMStyleData *)
    MMCDS_Properties,     //(const MMPropertyData *)
    MMCDS_Methods,        //(const MMMethodData *)
    MMCDS_PropertySheets, //(const MMPropertySheetData *)
    MMCDS_Includes,       // MMIndex *
    MMCDS_DDXTypes,       // MMIndex *
    MMCDS_Last
};
struct MMComponentDataSet {
    WUInt      numElements;
    MMIndex    elements;
};
struct MMComponentData : public MMCommonData {
    MMString             desc;
    MMString             varname;
    MMString             toolPage;
    MMString             toolPalette;
    WInt                 toolPriority;
    MMString             refTag;
    MMString             baseObject;
    WDWord               toolBitmaps[ 3 ];
    MMComponentDataSet   dataSets[ MMCDS_Last ];
    MMIndex              ddxProperty;//(const MMPropertyData *)
    MMIndex              refNodes;   // full hierarchy
    MMHelpID             helpID;
    WDWord               nonVisualResID;
    MMSize               defSize;   // default component size
    MMDTInstFnIndex      makeDT;  // function index to make DTObj
    MMString             reserved;
};
//------------------------
```

The MMComponent class stores the hierarchy of the Reference Card Contents page for each component, and can also provide a list of all properties and methods for populating the Find Page of the Reference Card.

Continuing with the method steps illustrated in FIG. 10, at step 1002, the system finds the component in the Contents page. Here, the Reference Card automatically selects the component in both the Contents and Find pages. In the Contents page, all components are stored in a Tree View hierarchy, an Optima++ supplied data structure (see e.g., the above-referenced Optima++ manuals). Specifically, the components are stored in the second level of the hierarchy. The system proceeds to iterate all nodes that are at the second level, comparing the component pointers with component. Once a match is found, the system expands the associated Tree View node, selects it, and makes it the first visible node in the Tree View hierarchy.

At step 1003, the system populates the categories for the component in the Contents page. Each component has several categories of methods and properties in the Contents page of the Reference Card. A method or property can appear in multiple categories. For efficiency, categories are not added to the TreeView until the associated component is expanded (either by the user manipulating the TreeView, or automatically as a result of step 1002). When a node is expanded, the Reference Card checks to see if the categories have been previously added. If such is not the case, the Reference Card iterates the associated categories and adds them to the TreeView. In turn, these categories will be demand-filled with properties and methods as they are expanded by the user.

At step 1004, the system finds the component in the Find page. The Find page of the Reference Card contains a ComboBox of all components. When a drop operation (user input event) occurs, the system iterates all entries in the ComboBox and checks if the component pointer is the same as component. If such is the case, the system selects the entry in the ComboBox.

At step 1005, the system fills the function list for the Find Page. The Find page of the reference card has a ListBox that contains properties and methods that apply to a given component. A text field is provided which can be used to narrow this search according to criteria specified on the Reference Card Options dialog (e.g., use an "Options" button of the Find page). The user can specify that this list is to be filled intermittently (e.g., every two seconds) or on every character press. Also, this list requires refilling when a different component is selected from the Component ComboBox. In such a case, the system retrieves the selected component from the Component ComboBox, and iterates its methods and properties. For each method and property name, the system compares the name to the pattern the user specified; this may be an empty pattern. If the name matches the pattern (or the pattern is empty), the system adds the method or property name to the ListBox.

At step 1006, the system fill an "Overload" ListBox for both the Contents and Find Pages. Both the Contents and Find pages have a ListBox that contains all of the overloaded instances of the selected function, such the one illustrated in FIG. 7G. Whenever a property or method is selected, the system iterates all of the different overloaded instances of that function and adds them to this ListBox.

At step 1007, the system launches the Parameter Wizard. When the user has navigated to an instance of an overloaded function that the user would like to call, he or she selects (e.g., "clicks") the "Parameters" button of the Contents or Find page (or double clicks the ListBox, or drags from the Contents page TreeView). Before launching the wizard, the system finds the selected function overloading in the ListBox. The system then dynamically creates a dialog based on the parameters and return type of the selected function overloading.

The data type of parameters can affect how the dialog is arranged—some data types, such as WColor, will provide a "Browse . . . " button that the user can click to browse for system colors. Enumerated data types are drawn from a set of possible values. The Parameter Wizard supplies all possible values in a drop-down ComboBox. Other parameter types require the user to type in the value as it will appear in code. Parameters can have a default value specified; this value represents the most commonly-used value for these parameters. By the system supplying these automatically, the user's task of coding a function call is simplified.

Some parameters are optional. These parameters always have a default value; if the user does not change an optional parameter, the parameter will not be emitted into the generated function call. All parameters up to the first changed parameter are emitted, however.

Finally, at step 1008, the system composes the function call. When the user clicks "Finish" in the Parameter Wizard, the system composes a function call and pastes that function call into the current code editor. If the user requested that the result be stored in a variable, the system adds the variable to the current function. The function call is composed using the object prefix specified, and the parameter values supplied. Optional parameters are emitted as required by the target language (e.g., required by C++ syntax rules), but are preferably omitted when possible.

Appended herewith as Microfiche Appendix A are C/C++ source listings providing further description of the present invention. A suitable compiler/linker for the source code is available for a variety of vendors, including Watcom C++ and Optima++, both of which are available from Sybase, Inc. of Emeryville, Calif.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a computer system having a development system for creating computer programs, the development system providing objects comprising components which can be placed on a form, a method for assisting a user with creation of code for a user's computer program displayed in a code editor, the method comprising:

receiving user input specifying that a particular component is to be placed on a form;

in response to said user input, identifying the particular component and displaying a reference card having information specific for the particular component, including displaying a list having properties and methods that apply to the particular component;

receiving user input selecting a particular method which is to be invoked for the particular component;

displaying a dialog providing parameters and return type of the selected method;

automatically supplying a default value for at least one of the parameters; and automatically composing a method call for the selected method and placing the method call into the user's computer program.

2. The method of claim 1, wherein said step of receiving user input specifying that a particular component is to be placed on a form comprises:

receiving user input for selecting the particular component from a component palette and placing the particular component so selected at a particular location on the form.

3. The method of claim 2, wherein said user input comprises input signals from a pointing device.

4. The method of claim 3, wherein said user interface component includes a button object.

5. The method of claim 1, wherein said particular component is a user interface component.

6. The method of claim 1, wherein said step of automatically composing a method call for the selected method and placing the method call into the user's computer program includes placing C++ code into the user's computer program.

7. The method of claim 1, wherein said reference card displays the list of properties and methods that apply to the particular component as a hierarchical list.

8. The method of claim 7, wherein said hierarchical list comprises a plurality of nodes, so that properties and methods that apply to a particular component are represented in the hierarchical list as children nodes which depend from a parent node representing the particular component.

9. The method of claim 8, further comprising:

receiving user input for selectively expanding and collapsing portions of the hierarchical list, for revealing or hiding particular nodes displayed on the list.

10. The method of claim 1, further comprising:

receiving user input for selecting a particular method which is displayed by the reference card; and in response to said user input, displaying a prototype representing the particular method which has been selected.

11. The method of claim 10, wherein said prototype comprises a name for the method, parameters which the method takes, and a return value which the method returns upon completing execution.

12. The method of claim 1, wherein said code is C++ code and wherein said prototype comprises a C++ function prototype.

13. The method of claim 1, wherein said particular method is an overloaded function for receiving different parameter information, and wherein said reference card displays multiple function prototypes, one for each possible type of parameter information received by the particular method.

14. The method of claim 1, wherein said properties comprise attributes of the component which affect its display on the form.

15. The method of claim 1, further comprising:
  invoking the reference card for a component which has already been placed on the form by:
    receiving user input for dragging the component from the form and dropping it onto a code editor displaying program code for the form; and
    in response to said user input, displaying a reference card for the component so dragged.

16. The method of claim 1, further comprising:
  assisting the user with input of parameter information by displaying a parameter wizard dialogue showing parameter information for a method which has been selected in the reference card.

17. The method of claim 1, wherein said step of receiving user input specifying that a particular component is to be placed on a form comprises:
  receiving user input for selecting a particular component from a component palette, followed by dragging and dropping that selected component onto a code editor.

18. The method of claim 1, wherein said step of receiving user input selecting a particular method which is to be invoked for the particular component comprises:
  receiving user input for selecting a particular method from the reference card, followed by dragging and dropping the particular method onto the code editor.

19. The method of claim 18, wherein the particular method is dropped onto the code editor at a position where the user desires insertion of the particular method into the program.

20. In a computer system having a development system for creating computer programs, the development system providing objects comprising components which can be placed on a form, a method for assisting a user with creation of code for a user's computer program displayed in a code editor, the method comprising:
  receiving first user input which drags a particular component from a component palette and drops it onto the code editor;
  in response to said first user input, displaying first information specific for the particular component, said first information comprising properties and methods that apply to the particular component;
  receiving second user input which drags a particular method for the particular component from the reference card and drops it onto the code editor;
  in response to said second user input, displaying second information specific for the particular component, said second information comprising parameters and return type of the particular method;
  receiving third user input requesting automatic placement of code in the program; and
  in response to said third user input, automatically composing a method call for the selected method and placing the method call into the user's computer program.

21. The method of claim 20, wherein said step which places the method call into the user's computer program comprises:
  automatically supplying a default value for at least one of the parameters.

22. The method of claim 20, wherein said particular component is a user interface component.

23. In a computer system having a development system for creating computer programs, the deveopment system providing objects comprising components which can be placed on a form, a method for assisting a user with creation of code for a user's computer program displayed in a code editor, the method comprising:
  receiving first user input which drags a particular component from a component palette and drops it onto the code editor;
  in response to said first user input, displaying first information specific for the particular component, said first information comprising properties and methods that apply to the particular component;
  receiving second user input which drags a particular method for the particular component from the reference card and drops it onto the code editor;
  in response to said second user input, displaying second information specific for the particular component, said second information comprising parameters and return type of the particular method;
  receiving third user input requesting automatic placement of code in the program; and
  in response to said third user input, automatically composing a method call for the selected method and placing the method call into the user's computer program,
  wherein said first information is displayed as an outline.

24. The method of claim 23, wherein said outline comprises a plurality of nodes, so that properties and methods that apply to a particular component are represented in the outline as children nodes which depend from a parent node representing the particular component.

25. The method of claim 24, further comprising:
  receiving user input for selectively expanding and collapsing portions of the outline, for revealing or hiding particular nodes displayed on the outline.

26. A development system for creating computer programs comprising:
  an integrated development environment providing components which can be placed on a form and an editor for editing code for a user's computer program; and
  drag-and-drop programming means comprising:
    means for dragging a particular component from a component palette and dropping it onto the code editor;
    means for displaying first information specific for the particular component, said first information comprising properties and methods that apply to the particular component;
    means for dragging a particular method for the particular component from the reference card and dropping it onto the code editor;
    means for displaying second information specific for the particular component, said second information comprising parameters and return type of the particular method; and
    means, responsive to a user request, for automatically composing a method call for the selected method and placing the method call into the user's computer program.

27. The system of claim 26, wherein said means which places the method call into the user's computer program comprises:

means for automatically supplying a default value for at least one of the parameters.

28. The system of claim 26, wherein said particular component is a user interface component.

29. A development system for creating computer programs comprising:

an integrated development environment providing components which can be placed on a form and an editor for editing code for a user's computer program; and drag-and-drop programming means comprising:

means for dragging a particular component from a component palette and dropping it onto the code editor;

means for displaying first information specific for the particular component, said first information comprising properties and methods that apply to the particular component;

means for dragging a particular method for the particular component from the reference card and dropping it onto the code editor;

means for displaying second information specific for the particular component, said second information comprising parameters and return type of the particular method; and means, responsive to a user request, for automatically composing a method call for the selected method and placing the method call into the user's computer program, wherein said first information is displayed as an outline.

30. The method of claim 29, wherein said outline comprises a plurality of nodes, so that properties and methods that apply to a particular component are represented in the outline as children nodes which depend from a parent node representing the particular component.

31. In a computer system having a development system for creating computer programs, the development system providing objects comprising components which can be placed on a form, a method for assisting a user with creation of code for a user's computer program displayed in a code editor, the method comprising:

receiving user input specifying that a particular component is to be placed on a form;

in response to said user input, identifying the particular component displaying screen feedback providing information specific for the particular component, including displaying properties and methods that apply to the particular component;

receiving user input selecting a particular method which is to be invoked for the particular component;

displaying a dialog providing parameters and return type of the selected method; and in response to drag-and-drop input from the user, automatically creating a method call for the selected method in the user's computer program.

32. The method of claim 31, wherein the method also operates to insert declarations for any local variables that the method requires.

33. The method of claim 31, wherein, said step of receiving user input specifying that a particular component is to be placed on a form comprises:

receiving user input for selecting the particular component from a component palette and placing the particular component so selected at a particular location on the form.

34. The method of claim 31, wherein said step of automatically creating a method call for the selected method includes automatically generating appropriate C++ code for insertion into the user's computer program.

35. The method of claim 31, wherein said step of displaying a dialog includes displaying a prototype representing the particular method which has been selected.

\* \* \* \* \*

UNITED STATES PATENT AND TRADEMARK OFFICE
CERTIFICATE OF CORRECTION

PATENT NO. : 6,233,726 B1                                 Page 1 of 1
DATED : May 1, 2001
INVENTOR(S) : Steffen Jung et al.

It is certified that error appears in the above-identified patent and that said Letters Patent is hereby corrected as shown below:

<u>Title page,</u>
Foreign Application Priority Data, should read as follows:

-- [30] September 30, 1996 (DE) ............. 1 96 40 80 --

Signed and Sealed this

Fifth Day of February, 2002

Attest:

JAMES E. ROGAN
*Attesting Officer*          *Director of the United States Patent and Trademark Office*

UNITED STATES PATENT AND TRADEMARK OFFICE
CERTIFICATE OF CORRECTION

PATENT NO. : 6,233,726 B1
DATED : May 15, 2001
INVENTOR(S) : Bowman et al.

Page 1 of 1

It is certified that error appears in the above-identified patent and that said Letters Patent is hereby corrected as shown below:

This certificate supersedes Certificate of Correction issued February 5, 2002, the number was erroneously mentioned and should be deleted since no certificate of correction was granted.

Signed and Sealed this

Fifth Day of March, 2002

Attest:

Attesting Officer

JAMES E. ROGAN
*Director of the United States Patent and Trademark Office*